US007867095B2

(12) United States Patent
Mattice et al.

(10) Patent No.: US 7,867,095 B2
(45) Date of Patent: Jan. 11, 2011

(54) CANDLE RADIO

(75) Inventors: Harold E. Mattice, Gardnerville, NV (US); William R. Wells, Reno, NV (US)

(73) Assignee: IGT, Reno, NV (US)

( * ) Notice: Subject to any disclaimer, the term of this patent is extended or adjusted under 35 U.S.C. 154(b) by 1215 days.

(21) Appl. No.: 11/156,161

(22) Filed: Jun. 17, 2005

(65) Prior Publication Data

US 2006/0287095 A1 Dec. 21, 2006

(51) Int. Cl.
*A63F 9/24* (2006.01)
*A63F 13/00* (2006.01)
*G06F 17/00* (2006.01)
*G06F 19/00* (2006.01)

(52) U.S. Cl. ............................ 463/46; 463/39; 463/42; 463/47; 463/48; 463/29; 455/73; 455/90; 455/66; 362/253; 362/457; 362/458

(58) Field of Classification Search .................... 463/46
See application file for complete search history.

(56) References Cited

U.S. PATENT DOCUMENTS 1,720,544 A 7/1929 De forest
2,240,328 A 4/1941 Crowley
2,275,507 A 3/1942 Crowley et al.
2,583,066 A 1/1952 Stiffel
4,099,722 A 7/1978 Rodesch et al.
5,046,066 A * 9/1991 Messenger .................. 370/349
5,116,055 A 5/1992 Tracy
5,259,616 A 11/1993 Bergmann
5,424,859 A * 6/1995 Uehara et al. ............... 398/127
5,493,722 A * 2/1996 Gunn et al. ................. 455/517
5,605,506 A 2/1997 Hoorn et al.
5,618,045 A * 4/1997 Kagan et al. .................. 463/40
5,668,803 A * 9/1997 Tymes et al. ................ 370/312
5,729,549 A * 3/1998 Kostreski et al. ............ 370/522
5,762,552 A * 6/1998 Vuong et al. .................. 463/25
5,797,085 A * 8/1998 Beuk et al. .................... 455/88
5,917,453 A * 6/1999 Uchino et al. ............... 343/721
6,039,459 A * 3/2000 Chang ........................ 362/253
6,215,984 B1 * 4/2001 Figueras et al. .......... 455/575.7
6,262,686 B1 * 7/2001 Delarminat et al. ......... 343/721
6,490,439 B1 * 12/2002 Croft et al. ................. 455/90.1
6,604,838 B2 * 8/2003 Jautz .......................... 362/225
6,638,170 B1 * 10/2003 Crumby ....................... 463/42
6,658,273 B1 * 12/2003 Sharp ...................... 455/575.1
6,682,423 B2 * 1/2004 Brosnan et al. ............... 463/29

(Continued)

*Primary Examiner*—Paul A. D'Agostino
(74) *Attorney, Agent, or Firm*—Weaver Austin Villeneuve & Sampson LLP

(57) ABSTRACT

Systems and methods for providing communications using the candle of a gaming machine are disclosed. A candle radio includes an antenna and transceiver within a housing, as well as one or more light sources and a mounting mechanism configured to mount the candle radio to a respective gaming machine or terminal. The transceiver and antenna are adapted to facilitate radio communications with at least one external transponder/transceiver, which can include wireless system access points and/or additional candle radios associated with other gaming machines. The antenna can be located at the top of the candle radio, while the transceiver can be located within a base at the bottom. An input connector on the transceiver facilitates communications with the gaming machine MGC. The candle radio can be adapted to split radio communications into portions and retransmit one or more portions of a communication, which may be done at differing radio frequencies.

24 Claims, 7 Drawing Sheets

U.S. PATENT DOCUMENTS 6,830,515 B2 * 12/2004 Rowe .......................... 463/42
7,014,563 B2 * 3/2006 Stephan et al. ................ 463/47
7,182,690 B2 * 2/2007 Giobbi et al. ................. 463/24

* cited by examiner

CANDLE RADIO

TECHNICAL FIELD

The present invention relates generally to gaming machines and systems, and more specifically to communications within gaming machines and systems.

BACKGROUND

Casinos and other forms of gaming comprise a growing multi-billion dollar industry both domestically and abroad, with electronic and microprocessor based gaming machines being more popular than ever. In a typical electronic gaming machine, such as a slot machine, video poker machine, video keno machine or the like, a game play is initiated through a player wager of money or credit, whereupon the gaming machine determines a game outcome, presents the game outcome to the player and then potentially dispenses an award of some type, including a monetary award, depending upon the game outcome. Many additional gaming machine components, features and programs have been made possible in recent years through this proliferation of electronic gaming machines, including those involving linked progressive jackpots, player tracking and loyalty points programs, and various forms of cashless gaming, among other items. Many of these added components, features and programs can involve the implementation of various back-end and/or networked systems, including more hardware and software elements, as is generally known.

Electronic and microprocessor based gaming machines themselves can include various hardware and software components to provide a wide variety of game types and game playing capabilities, with such hardware and software components being generally well known in the art. A typical electronic gaming machine will have a central processing unit ("CPU") or master gaming controller ("MGC") that controls various combinations of hardware and software devices and components that encourage game play, allow a player to play a game on the gaming machine and control payouts and other awards. Software components can include, for example, boot and initialization routines, various game play programs and subroutines, credit and payout routines, image and audio generation programs, various component modules and a random number generator, among others. Hardware devices and peripherals can include, for example, bill validators, coin acceptors, card readers, keypads, buttons, levers, touch screens, coin hoppers, player tracking units and the like. In addition, each gaming machine can have various audio and visual display components that can include, for example, speakers, display panels, belly and top glasses, exterior cabinet artwork, lights, and top box dioramas, as well as any number of video displays of various types to show game play and other assorted information, with such video display types including, for example, a cathode ray tube ("CRT"), a liquid crystal display ("LCD"), a light emitting diode ("LED"), a flat panel display and a plasma display, among others.

Another hardware device common to gaming machines is the candle, which is typically located atop the gaming machine in the form of a small cylinder, usually having a plurality of luminous sections of varying colors. Many gaming jurisdictions require each gaming machine to have some form of candle on top of it. Many gaming jurisdictions also dictate the number of lights, their various colors and meanings, the light patterns and the flash rate of the various colors, among other specifics. Although typically in the form of a cylinder placed atop the gaming machine, it will be readily appreciated that other forms of and locations for candles also exist and may be developed, and it will be understood that any device providing a function of a conventional candle may also be considered a candle for purposes of the present disclosure. Such additional forms can include a wide variety of other shapes and sizes, several illustrative examples for which are provided below. Other locations can include virtually any place on or about a gaming machine. Some alternative examples might even include one or more bezels about any display or other gaming machine feature, as well as one or more bolsters running along any edge or other gaming machine feature.

In general though, candles are usually placed atop gaming machines, such that they can be seen from all or most all directions, whereby security cameras and floor personnel can more readily view them. Virtually all candles are used at least for the purpose of visual communications from a gaming machine to security, change people, service technicians, and/or other casino or gaming floor personnel. Examples of uses for candle communications can include a particular color of light that comes on when a coin hopper needs refilling, when a player needs change, when a jackpot is hit, or when a gaming machine door has been opened. For example, a particular candle might include a white section that becomes illuminated when service has been requested by a player at that gaming machine, a yellow section that lights up when a jackpot has been hit at the associated gaming machine, and a red section that becomes illuminated when a breach in security at the gaming machine has been detected, such as a main door being open. Of course, other combinations, colors and uses are also possible, as will be readily appreciated.

In addition to visual communications, another form of communication that can transpire with the use of gaming machine candles is that of radio signals or other wireless communications, such as between a candle and a wireless casino system. An antenna can be provided within the candle for this purpose, with this being a favorable location due to the typical prominence of the candle atop the gaming machine. The gaming machine can then communicate with a system server or computer through the candle of the gaming machine and an access point of the wireless system. Various details and examples of such a candle antenna and wireless gaming system are disclosed in, for example, commonly assigned U.S. Pat. No. 5,605,506 by Hoorn, et al., entitled "Candle Antenna" ("Hoorn"), which is incorporated by reference herein in its entirety and for all purposes.

Presently, the transceiver for a candle antenna and radio system is placed inside the gaming machine, usually in the main cabinet. For example, a transceiver that is typically used in conjunction with the candle antenna of Hoorn is disposed within a transceiver box inside the main cabinet measuring 9.5 inches long by 5 inches wide by 2.5 inches deep. A lengthy coaxial cable is then run through the machine to connect the transceiver to the antenna inside the candle atop the machine. As will be readily appreciated, the use of a coaxial cable tends to result in power losses, which attenuate the radio frequency signal between the antenna and the transceiver. Such power losses and the resulting attenuation of the radio signal tend to increase with the increased length of the cable. The cost of using such cables can also be an issue, as a coaxial cable and any coaxial connectors that are thereby required can be relatively expensive.

Another drawback under the present setup involves the difficulty in repairing, updating or replacing an antenna and transceiver. Presently, the main door of the gaming machine must usually be opened to access the transceiver, which can be time consuming and inconvenient. Where the transceiver might be installed in a top box or other such location, even more intrusive methods of access might be necessary. In addition, where any rewiring needs to take place, access to some or all wiring locations from the candle to the transceiver can be even more time consuming and inconvenient.

Furthermore, wireless communications using candle antennae and their associated transceivers within gaming machines have been relatively limited to date. Established systems and protocols only permit transmissions to and from one or more access points in a wireless system, with communications ultimately being received and processed only at a system computer or server. Such limited applications tend to result in an inflexible system, however, with many locations in a casino or other gaming establishment being summarily prevented from accessing the wireless system due to the infeasibility of providing an infinite number of system access points. For example, while it may be possible for a gaming operator to place a number of gaming machines along a lengthy and twisted corridor, such as between a casino floor and a bank of hotel elevators, it is simply not practical to provide the necessary several wireless access points along that corridor to serve the relatively few machines there.

While existing systems and methods for providing communications in candles, gaming machines and gaming systems have been adequate in the past, improvements are usually welcomed and encouraged. In light of the foregoing, it is desirable to develop systems and methods that can provide the same or even better wireless communication capabilities in candles in a more efficient manner and for less cost, and in particular for such methods and systems to permit more flexibility in wireless communications, such that a greater number of locations are available to place gaming machines utilizing wireless communications with candles.

SUMMARY

It is an advantage of the present invention to provide improved systems and methods for permitting wireless communications involving candles in a gaming machine or system. This is accomplished in many embodiments by providing within or about a gaming machine or system at least one candle radio having both the antenna and receiver or transceiver within the candle housing itself. Advantages of such an arrangement can include the elimination of expensive parts, a reduction in power and signal losses between the antenna and receiver or transceiver, and the more self contained nature of the candle radio, such that replacements and repairs can be more readily and efficiently performed. Communications can be made between the candle radio and one or more wireless system access points, as well as one or more additional candle radios associated with an additional gaming machine or machines.

According to several embodiments of the present invention, the disclosed systems and methods involve a gaming machine and/or gaming system adapted for accepting a wager, playing a game based on the wager and granting a payout based on the result of the game. The gaming machine or system can include an exterior chassis, housing or other physical terminal having an upper surface and arranged to contain a plurality of internal components therein, as well as an MGC adapted to control one or more game aspects. Embodiments including a gaming machine and/or gaming system can also include a plurality of input and output devices adapted to facilitate the acceptance of a wager, display of a game and grant of a monetary payout. In addition to controlling various game aspects, the MGC can also be in communication with and/or control one or more aspects of various other gaming machine or system components, such as a candle radio.

In embodiments involving a gaming machine or system, the candle radio can be disposed at an outer surface of the gaming machine or other associated gaming terminal, such as atop an upper surface. Other locations of good visual prominence are also viable. Other embodiments may include only the candle radio itself or a portion thereof. In many embodiments with and without a gaming machine or other gaming terminal, the candle radio can include a substantially or at least partially hollow candle housing that is at least partially transparent to light, one or more light sources disposed within the candle housing and arranged such that light emitting therefrom is visible outside of the candle housing, an antenna disposed within the candle housing and adapted to facilitate radio communications with at least one external transponder and/or transceiver, and a candle receiver or transceiver disposed within the candle housing, in communication with the antenna, and adapted to conduct radio communications with the external transponders and/or transceivers.

In addition, the candle radio can further include a mounting mechanism configured to mount the candle radio to a respective gaming machine or terminal. The candle housing can be substantially cylindrical, although many other shapes and a wide variety of sizes are possible. The antenna is preferably positioned at or near the top of the candle interior, possibly above one or all light sources. The candle housing may also include a base at its bottom, and the candle transceiver or receiver can be disposed within such a base. In addition, the candle transceiver or receiver can include at least one input connector adapted to facilitate further communications with the MGC of a respective gaming machine or terminal. Such an input connector can be an RS-232, USB or Ethernet connector. In addition, particularly where multiple communications are to be made across multiple frequencies, a candle radio may comprise multiple transceivers and/or antennae.

In some embodiments, one external transceiver or transponder can include a wireless access point to an overall host system. Additional wireless access points can also be in communication with the candle transceiver or transponder. Such wireless access points can be configured for wireless communication with one or more candle radios, and can also be hard wired to a system server or host. The external transceivers and/or transponders in communication with the candle radio can also include other one or more other candle radios, which can include separate transceivers or receivers associated with one or more other gaming machines or terminals. In some embodiments, a candle transceiver can be adapted to receive a radio communication from one external transceiver or transponder, and then forward at least a portion of that radio communication to another external transceiver or receiver. Such communications can come from wireless access points, other candle radios, or both, and can be forwarded or delivered to wireless access points, other candle radios, or both.

In some embodiments, the forwarded radio communication is sent at a radio frequency that is different than the radio frequency at which it was received. In this regard, the candle radio can be adapted to send out radio signals at a frequency that is different than a frequency at which it receives signals. In some embodiments, the candle radio can receive signals at multiple frequencies, and can also send signals at multiple frequencies. In some embodiments, the candle radio is adapted to split a radio communication into a plurality of portions. Some or all split portions can be forwarded or retransmitted, and some may be sent at differing frequencies, as desired. Various combinations of receiving radio communications from a variety of different sources, source types and radio frequencies, splitting these communications into one or more portions, otherwise acting on these communications, and sending these communications to a variety of different destination and destination types at a variety of radio frequencies are all contemplated.

Further embodiments of the present invention include gaming systems having a plurality of physical terminals including input and output devices adapted to facilitate the acceptance of wagers, display of games and granting of monetary payouts, at least one MGC, a plurality of candle radios associated with the physical terminals, a host computer in communication with the plurality of candle radios, and at least one wireless system access point including a transceiver electrically coupled to the host computer and adapted to conduct radio communications with at least one of the candle radios. The host computer can be arranged to process data from and issue instructions to the plurality of candle radios, or both. The physical terminals can include gaming machines, as well as other physical items at which a player can participate in a gaming session.

According to still further embodiments of the present invention, various methods of conducting wireless communications within a gaming system are provided. Pertinent process steps can include providing a gaming machine or terminal having a candle radio and other various items, as detailed above, sending a wireless communication from an external transponder or transceiver to the candle radio, receiving the communication at an antenna disposed within the candle housing, transmitting the communication to a candle receiver or transceiver disposed within the candle housing and acting upon the communication at the candle receiver or transceiver. Such a step of acting upon the communication can include causing a light source at the candle housing to become illuminated, splitting the communication into a plurality of portions, and/or retransmitting the communication from the candle radio. As noted above, such a retransmission can be to one or more external targets that can include the original external transceiver and/or a further external transceiver or receiver, any of which can be a wireless access point or another candle radio.

Additional process steps can include making a retransmission of one or more portions of the original communication, and/or making a retransmission at a radio frequency that is different from the original radio frequency at which the original communication was received. In addition, a step of replacing an entire candle radio at a gaming machine or terminal with another entire candle radio can be included. Such a replacement step is preferably streamlined, in that it does not involve any internal access to the gaming machine or terminal. This is made possible due to the fact that the receiver or transceiver is located within the candle itself.

Other methods, features and advantages of the invention will be or will become apparent to one with skill in the art upon examination of the following figures and detailed description. It is intended that all such additional methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and process steps for the disclosed inventive systems and methods for providing communications in a gaming network using candle radios. These drawings in no way limit any changes in form and detail that may be made to the invention by one skilled in the art without departing from the spirit and scope of the invention.

DETAILED DESCRIPTION

Figure 1:
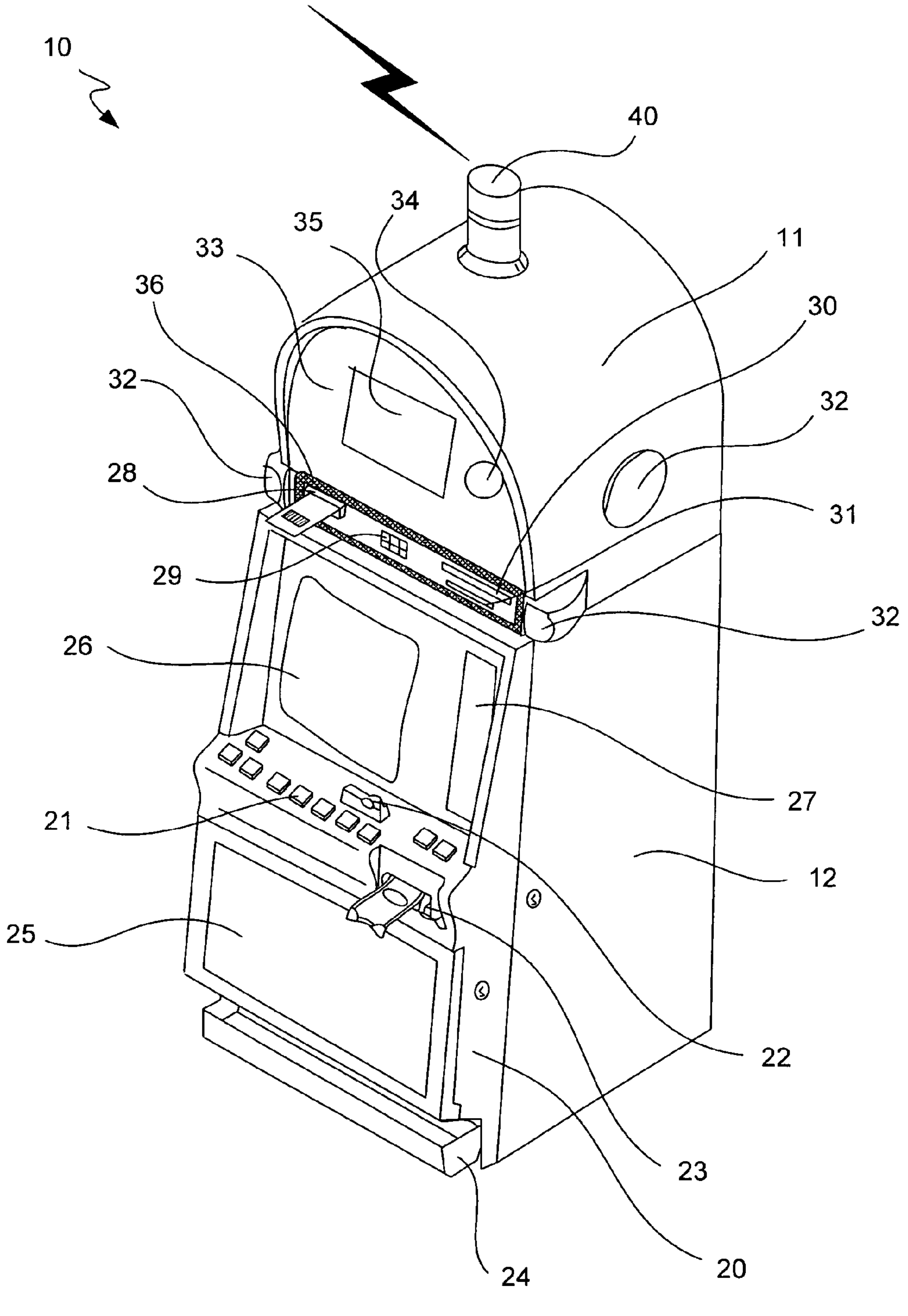
FIG. 1 illustrates in perspective view an exemplary gaming machine having a candle.

Exemplary applications of systems and methods according to the present invention are described in this section. These examples are being provided solely to add context and aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following example should not be taken as definitive or limiting either in scope or setting. In the detailed description that follows, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting, such that other embodiments may be used and changes may be made without departing from the spirit and scope of the invention.

A general advantage of the present invention is the introduction of systems and methods that better enable the use of a wireless communication gaming network involving gaming machine candles. This is accomplished at least in part by the introduction of a transceiver or receiver within the candle itself. This is particularly useful in comparison to previous candle systems adapted for radio communications, where the transceiver or receiver was located within the gaming machine top box or main cabinet. Specific advantages of such a candle radio device include the elimination of expensive parts, such as coaxial cables, and a reduction in power and signal losses between the antenna and transceiver, which are now much closer to each other. The candle radio is also more self-contained, such that replacements and repairs can be more readily and efficiently performed.

Further advantages of the various apparatuses, systems and methods disclosed herein include the ability to communicate with a wider variety of external sources, as well as enhanced processing and action capabilities within the candle radio itself. Communications can be made not only between the candle radio and one or more wireless system access points, but also with one or more additional candle radios associated with one or more additional gaming machines or terminals. Using such a system, communications can be repeated and forwarded from candle to candle, such that fewer system access points are required, and such that a wider variety of operable locations for candle radios are possible. Added functions within the candle radio that enhance system abilities can include a splitter function, whereby various radio communications can be split or parsed into multiple portions, and the ability to receive and retransmit communications at varying radio frequencies.

Although the present invention is directed primarily to gaming machines and systems, it is worth noting that some of the apparatuses, systems and methods disclosed herein might be adaptable for use in other types of devices, systems or environments, as applicable, such that their use is not restricted exclusively to gaming machines and contexts. Such other adaptations may become readily apparent upon review of the inventive apparatuses, systems and methods illustrated and discussed herein. For instance, a candle radio as disclosed herein could be used with a gaming device other than a traditional gaming machine, such as, for example, a "Skee-ball" game, a "Fascination" rubber ball style bingo game, or any other similarly suitable arcade or carnival type game, particularly where such a game might also use candles, such as to indicate a winner, a malfunction, and/or a security alert.

Gaming Machines

Referring first to FIG. 1, an exemplary gaming machine is illustrated in perspective view. Gaming machine 10 includes a top box 11 and a main cabinet 12, which generally surrounds the machine interior (not shown) and is viewable by users. This top box and/or main cabinet can together or separately form an exterior housing adapted to contain a plurality of internal gaming machine components therein. Main cabinet 12 includes a main door 20 on the front of the gaming machine, which preferably opens to provide access to the gaming machine interior. Attached to the main door are typically one or more player-input switches or buttons 21, one or more money or credit acceptors, such as a coin acceptor 22 and a bill or ticket validator 23, a coin tray 24, and a belly glass 25. Viewable through main door 20 is a primary video display monitor 26 and one or more information panels 27. The primary video display monitor 26 will typically be a cathode ray tube, high resolution flat-panel LCD, plasma/LED display or other conventional or other type of appropriate video monitor. Alternatively, a plurality of gaming reels can be used as a primary gaming machine display in place of display monitor 26, with such gaming reels preferably being electronically controlled, as will be readily appreciated by one skilled in the art.

Top box 11, which typically rests atop of the main cabinet 12, may contain a ticket printer 28, a key pad 29, one or more additional displays 30, a card reader 31, one or more speakers 32, a top glass 33, one or more cameras 34, and a secondary video display monitor 35, which can similarly be a cathode ray tube, a high resolution flat-panel LCD, a plasma/LED display or any other conventional or other type of appropriate video monitor. Alternatively, secondary display monitor 35 might also be foregone in place of other displays, such as gaming reels or physical dioramas that might include other moving components, such as, for example, one or more movable dice, a spinning wheel or a rotating display, among others. A bezel 36 might also be provided around or about one or more gaming machine components, such as a top box base, as shown. Other items that may also have a bezel around or about them can include, for example, primary display 26, secondary display 35 and belly glass 25, among others. Such bezels may be illuminated, as is generally known in the art. As is also generally known in the art, some or all of the foregoing peripheral items may be in communication with the gaming machine MGC (not shown), which is typically located in the main cabinet.

In addition, a candle 40 might be located atop the gaming machine, such as on an upper surface of top box 11. Candle 40 is also typically in communication with the MGC of the gaming machine, as is generally known. As noted above, many gaming jurisdictions require all gaming machines to have a candle to provide visual communications to floor personnel. As shown in FIG. 1, candle 40 is at least adapted for radio communications, and as such contains at least a candle antenna therein, such as the candle antenna described in Hoorn. It will be understood that many makes, models, types and varieties of gaming machines exist, that not every such gaming machine will include each of the foregoing items, and that many gaming machines will include other items not shown. Such gaming machines are made by many manufacturers, such as, for example, IGT of Reno, Nev.

With respect to electronic gaming machines in particular, the electronic gaming machines made by IGT are provided with special features and additional circuitry that differentiate them from general-purpose computers, such as a laptop or desktop personal computer ("PC"). Because gaming machines are highly regulated to ensure fairness, and in many cases are operable to dispense monetary awards of millions of dollars, hardware and software architectures that differ significantly from those of general-purpose computers may be implemented into a typical electronic gaming machine in order to satisfy security concerns and the many strict regulatory requirements that apply to a gaming environment. A general description of many such specializations in electronic gaming machines relative to general-purpose computing machines and specific examples of the additional or different components and features found in such electronic gaming machines will now be provided.

At first glance, one might think that adapting PC technologies to the gaming industry would be a simple proposition, since both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

Accordingly, one difference between gaming machines and common PC based computers or systems is that gaming machines are designed to be state-based systems. In a state-based system, the system stores and maintains its current state in a non-volatile memory, such that in the event of a power failure or other malfunction the gaming machine will return to its current state when the power is restored. For instance, if a player were shown an award for a game of chance and the power failed before the award was provided, the gaming machine, upon the restoration of power, would return to the state where the award was indicated. As anyone who has used a PC knows, PCs are not state machines, and a majority of data is usually lost when a malfunction occurs. This basic requirement affects the software and hardware design of a gaming machine in many ways.

A second important difference between gaming machines and common PC based computer systems is that for regulation purposes, the software on the gaming machine used to generate the game of chance and operate the gaming machine must be designed as static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulator in a particular jurisdiction and installed in the presence of a person representing the gaming jurisdiction. Any change to any part of the software required to generate the game of chance, such as, for example, adding a new device driver used by the master gaming controller to operate a device during generation of the game of chance, can require a new EPROM to be burnt, approved by the gaming jurisdiction, and reinstalled on the gaming machine in the presence of a gaming regulator. Regardless of whether the EPROM solution is used, to gain approval in most gaming jurisdictions, a gaming machine must demonstrate sufficient safeguards that prevent an operator of the gaming machine from manipulating hardware and software in a manner that gives the operator an unfair or even illegal advantage over a player. The code validation requirements in the gaming industry affect both hardware and software designs on gaming machines.

A third important difference between gaming machines and common PC based computer systems is that the number and kinds of peripheral devices used on a gaming machine are not as great as on PC based computer systems. Traditionally in the gaming industry, gaming machines have been relatively simple in the sense that the number of peripheral devices and the number of functions on the gaming machine have been limited. Further, the functionality of a gaming machine tends to remain relatively constant once the gaming machine is deployed, in that new peripheral devices and new gaming software is infrequently added to an existing operational gaming machine. This differs from a PC, where users tend to buy new and different combinations of devices and software from different manufacturers, and then connect or install these new items to a PC to suit their individual needs. Therefore, the types of devices connected to a PC may vary greatly from user to user depending on their individual requirements, and may also vary significantly over time for a given PC.

Although the variety of devices available for a PC may be greater than on a gaming machine, gaming machines still have unique device requirements that differ from a PC, such as device security requirements not usually addressed by PCs. For instance, monetary devices such as coin dispensers, bill validators, ticket printers and computing devices that are used to govern the input and output of cash to a gaming machine have security requirements that are not typically addressed in PCs. Many PC techniques and methods developed to facilitate device connectivity and device compatibility do not address the emphasis placed on security in the gaming industry. To address some of these issues, a number of hardware/software components and architectures are utilized in gaming machines that are not typically found in general-purpose computing devices, such as PCs. These hardware/software components and architectures include, but are not limited to, items such as watchdog timers, voltage monitoring systems, state-based software architectures and supporting hardware, specialized communication interfaces, security monitoring, and trusted memory.

A watchdog timer is normally used in IGT gaming machines to provide a software failure detection mechanism. In a normal operating system, the operating software periodically accesses control registers in a watchdog timer subsystem to "re-trigger" the watchdog. Should the operating software not access the control registers within a preset timeframe, the watchdog timer will time out and generate a system reset. Typical watchdog timer circuits contain a loadable timeout counter register to allow the operating software to set the timeout interval within a certain time range. A differentiating feature of some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out of tolerance voltages can cause software malfunction, creating a potential uncontrolled condition in the gaming computer. IGT gaming machines, however, typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for IGT gaming machine game software is to use a state machine. Each function of the game (e.g., bet, play, result) is defined as a state. When a game moves from one state to another, critical data regarding the game software is stored in a custom non-volatile memory subsystem. In addition, game history information regarding previous games played, amounts wagered, and so forth also should be stored in a non-volatile memory device. This feature allows the game to recover operation to the current state of play in the event of a malfunction, loss of power, or the like. This is critical to ensure that correct wagers and credits are preserved. Typically, battery backed RAM devices are used to preserve this critical data. These memory devices are not used in typical general-purpose computers. Further, IGT gaming computers normally contain additional interfaces, including serial interfaces, to connect to specific subsystems internal and external to the gaming machine. The serial devices may have electrical interface requirements that differ from the "standard" EIA RS232 serial interfaces provided by general-purpose computers. These interfaces may include EIA RS485, EIA RS422, Fiber Optic Serial, optically coupled serial interfaces, current loop style serial interfaces, and the like. In addition, to conserve serial interfaces internally in the gaming machine, serial devices may be connected in a shared, daisy-chain fashion where multiple peripheral devices are connected to a single serial channel.

IGT gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this. In addition, security monitoring circuits detect intrusion into an IGT gaming machine by monitoring security switches attached to access doors in the gaming machine cabinet. Preferably, access violations result in suspension of game play and can trigger additional security operations to preserve the current state of game play. These circuits also function when power is off by use of a battery backup. In power-off operation, these circuits continue to monitor the access doors of the gaming machine. When power is restored, the gaming machine can determine whether any security violations occurred while power was off, such as by software for reading status registers. This can trigger event log entries and further data authentication operations by the gaming machine software.

Trusted memory devices are preferably included in an IGT gaming machine computer to ensure the authenticity of the software that may be stored on less secure memory subsystems, such as mass storage devices. Trusted memory devices and controlling circuitry are typically designed to not allow modification of the code and data stored in the memory device while the memory device is installed in the gaming machine. The code and data stored in these devices may include, for example, authentication algorithms, random number generators, authentication keys, operating system kernels, and so forth. The purpose of these trusted memory devices is to provide gaming regulatory authorities a root trusted authority within the computing environment of the gaming machine that can be tracked and verified as original. This may be accomplished via removal of the trusted memory device from the gaming machine computer and verification of the secure memory device contents is a separate third party verification device. Once the trusted memory device is verified as authentic, and based on the approval of verification algorithms contained in the trusted device, the gaming machine is allowed to verify the authenticity of additional code and data that may be located in the gaming computer assembly, such as code and data stored on hard disk drives.

Mass storage devices used in a general-purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present. In addition to the basic gaming abilities provided, these and other features and functions serve to differentiate gaming machines into a special class of computing devices separate and distinct from general-purpose computers.

With respect to the basic gaming abilities provided, it will be readily understood that gaming machine 10 can be adapted for presenting and playing any of a number of gaming events, particularly games of chance involving a player wager and potential monetary or other payout, such as, for example, a wager on a sporting event or general play as a slot machine game, a keno game, a video poker game, a video blackjack game, and/or any other video table game, among others. While gaming machine 10 can typically be adapted for live game play with a physically present player, it is also contemplated that such a gaming machine may also be adapted for game play with a player at a remote gaming terminal. Other features, functions and devices may also be used in association with gaming machine 10, and it is contemplated that the present invention can be used in conjunction with a gaming machine or device that might encompass any or all such additional types of features, functions and devices. One item that is specifically contemplated for use with the present invention involves a gaming machine that incorporates a candle radio that includes both an antenna and transceiver disposed therein, as detailed below.

Network and System Configurations

Figure 2:
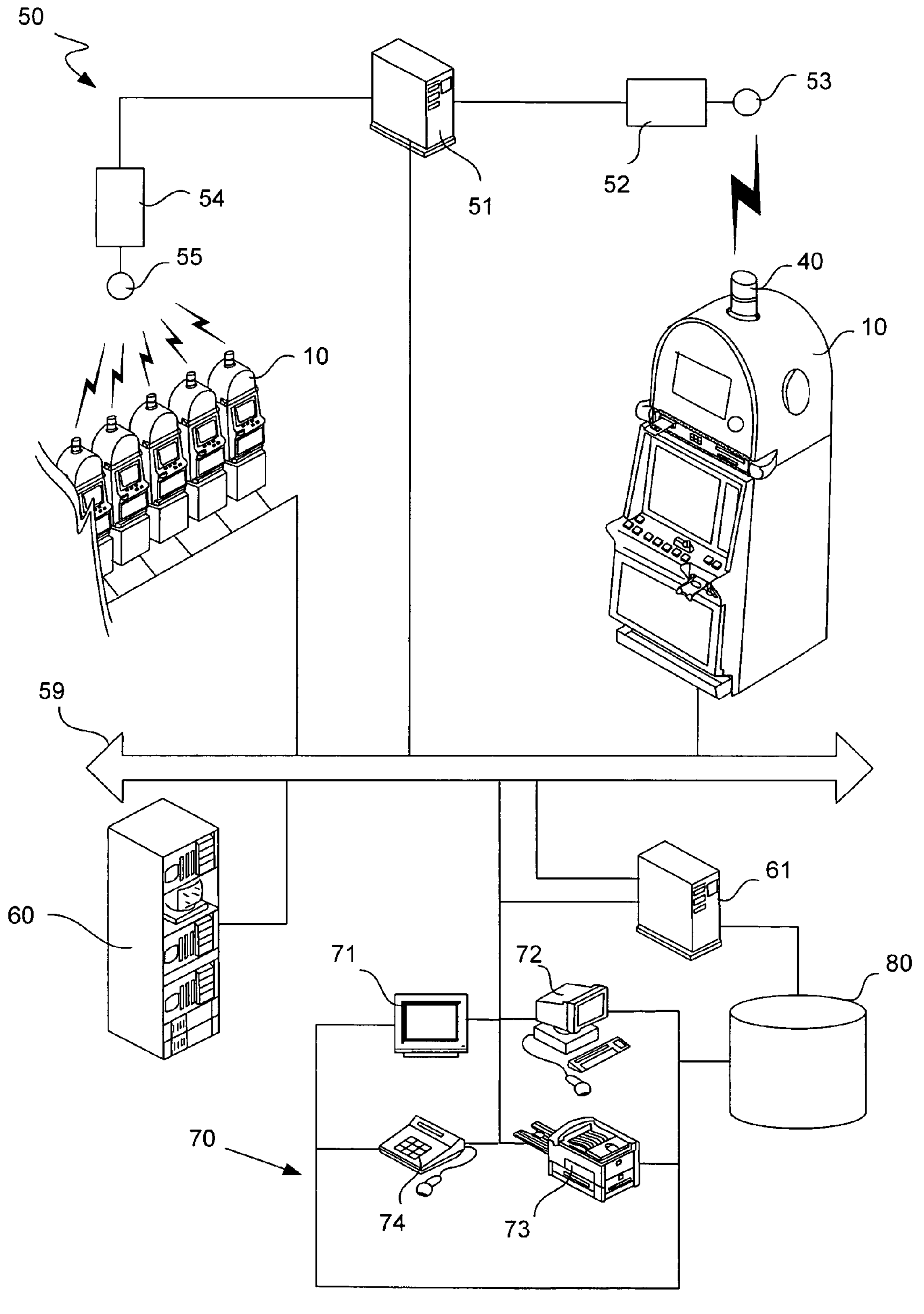
FIG. 2 illustrates in block diagram format an exemplary network infrastructure for providing a gaming system having one or more gaming machines with candles and one or more wireless access points connected to a central server.

Moving next to FIG. 2, an exemplary network infrastructure for providing a gaming system having one or more gaming machines is illustrated in block diagram format. Exemplary gaming system 50 has one or more gaming machines, various communication items, and a number of host-side components and devices adapted for use within a gaming environment. As shown, one or more gaming machines 10 adapted for use in gaming system 50 can be in a plurality of locations, such as in banks on a casino floor or standing alone at a smaller non-gaming establishment, as desired. At least two separate major modes of communication are present within gaming system 50, with one mode utilizing wireless communications along a wireless network, and the other using a wired network having a variety of networked items. Although many of the communication links shown are represented as wired links, it will be readily appreciated that any suitable form of communication and protocol may be substituted instead. For example, some or all of the communication links shown may be wireless links under the appropriate circumstances.

Referring first to the as illustrated "wireless" portion of gaming system 50, a host computer or server 51 communicates with radio base stations 52, 54 via wired links. Again, such wired links may also be wireless, if desired. Either or both of radio base stations 52, 54 can be primary or secondary base stations, and it will be understood that additional base stations not shown may also be present, particularly where many more gaming machines are within gaming system 50. Also, a single base station might be used in some cases, such as where a gaming system is relatively small and all gaming machines involved are confined to a single floor area. As will be readily appreciated, a secondary base station can be used as a redundant station to back up a primary base station, should the primary base station go down. Each base station 52, 54 can include an antenna, such as low profile antennae 53 and 55 respectively. Each base station and antenna unit generally comprises a wireless system access point, and it will be understood that a wide variety of suitable specific devices can be used to create any given wireless system access point.

Each base station 52, 54 includes at least a radio transponder or receiver, and preferably a radio transceiver adapted to both send and receive radio frequency signals to and from the candle 40 of one or more gaming machines 10. These gaming machines are also preferably adapted to send and receive radio frequency signals through their candles. Although only four gaming machines have been shown in this example, many more may be employed in a given casino (e.g., up to 100 or more per base station radio). The wireless host computer or server 51 may be any of a variety of commercially available computer systems. Such computer systems can include, but are not limited to, for example, any of the various systems commercially provided by Dell, HP, IBM and others, as well as any other suitable and system compatible computer systems. The wireless host computer or server 51 can also include a variety of multiple workstations, terminals, displays, disk drives, databases, printers and input devices with fixed and/or removable media (not shown) all connected over a communication network consistent with industry standards, such as Token Ring, Ethernet and the like. Typically, wireless host computer or server 51 will be provided with a front end controller (not shown), which is able to handle data concurrently provided through multiple ports.

Moving next to the wired portion of gaming system 50, a common bus 59 can connect one or more gaming machines, terminals or devices 10 to a number of networked devices on the gaming system 50, such as, for example, a general-purpose server 60, one or more special-purpose servers 61, a sub-network of peripheral devices 70, and/or a database 80. A wired or wireless link from common bus 59 to wireless host or server 51 may also be present, as shown. A general-purpose server 60 may be one that is already present within a casino or other establishment for one or more other purposes beyond any system communications involving gaming machine candles. Functions for such a general-purpose server can include general and game specific accounting functions, payroll functions, general Internet and e-mail capabilities, switchboard communications, and reservations and other hotel and restaurant operations, as well as other assorted general establishment record keeping and operations. In some cases, specific gaming related functions such as cashless gaming, downloadable gaming, player tracking, remote game administration, video or other data transmission, or other types of functions may also be associated with or performed by such a general-purpose server. For example, such a server may contain various programs related to player tracking operations, specific player account administration, remote game play administration, remote game player verification, downloadable gaming, and/or visual image or video data storage, transfer and distribution, and may also be linked to one or more gaming machines, in some cases forming a network that includes all or many of the gaming devices and/or machines within the establishment. Communications can then be exchanged from each gaming machine to one or more related programs or modules on the general-purpose server.

In one embodiment, gaming system 50 contains one or more special-purpose servers that can be used for various specific functions relating to gaming machine administration and operation under the present methods and systems. Such a special-purpose server or servers could include, for example, a player tracking server, a cashless gaming server, a player verification server, a specific game server, a downloadable games server, a specialized accounting server, and/or a visual image or video distribution server, among others. Wireless host server 51 might also be tied into this wired network as well, if desired. Of course, some or all of these functions may be combined onto a single server, such as specialized server 61. Such additional special-purpose servers are desirable for a variety of reasons, such as, for example, to lessen the burden on an existing general-purpose server or to isolate or wall off some or all gaming machine administration and operations data and functions from the general-purpose server and thereby increase security and limit the possible modes of access to such operations and information.

Alternatively, exemplary gaming system 50 can be isolated from any other network at the establishment, such that a general-purpose server 60 is essentially impractical and unnecessary. Under either embodiment of an isolated or shared network, one or more of the special-purpose servers are preferably connected to sub-network 70, which might be, for example, a cashier station or terminal. Peripheral devices in this sub-network may include, for example, one or more video displays 71, one or more user terminals 72, one or more printers 73, and one or more other input devices 74, such as a card reader or other security identifier, among others. A similar sub-network can also be present in association with wireless server host 51, as noted above. Under either embodiment of an isolated or shared network, at least the specialized server 61 or another similar component within a general-purpose server 60 preferably includes a connection to a database or other suitable storage medium 80. Database 80 can be adapted to store many or all files containing pertinent tracked data or information, as desired. Files, data and other information on database 90 can be stored for backup purposes, and are preferably accessible at one or more system locations, such as at a general-purpose server 60, a special purpose server 61 and/or a cashier station or other sub-network location 70, as desired.

While gaming system 50 can be a system that is specially designed and created new for use in a casino or gaming establishment, it is also possible that many items in this system can be taken or adopted from an existing gaming system. For example, gaming system 50 could represent an existing player tracking and wireless candle communication system to which one or more of the inventive components or program modules are added. In addition to new hardware in the form of candle radios, new functionality via new software, modules, updates or otherwise can be provided, as needed. In this manner, the methods and systems of the present invention may be practiced at reduced costs by gaming operators that already have existing gaming systems, by simply modifying the existing system. Other modifications to an existing system may also be necessary, as might be readily appreciated. In addition, it will be readily appreciated that some gaming machines within gaming system 50 may be a part of only the wireless component of the overall gaming system, while other gaming machines may be a part of only the wired component of the gaming system via common bus 59, while still other gaming machines may be a part of both portions, as desired.

General Candles

Figure 3A:
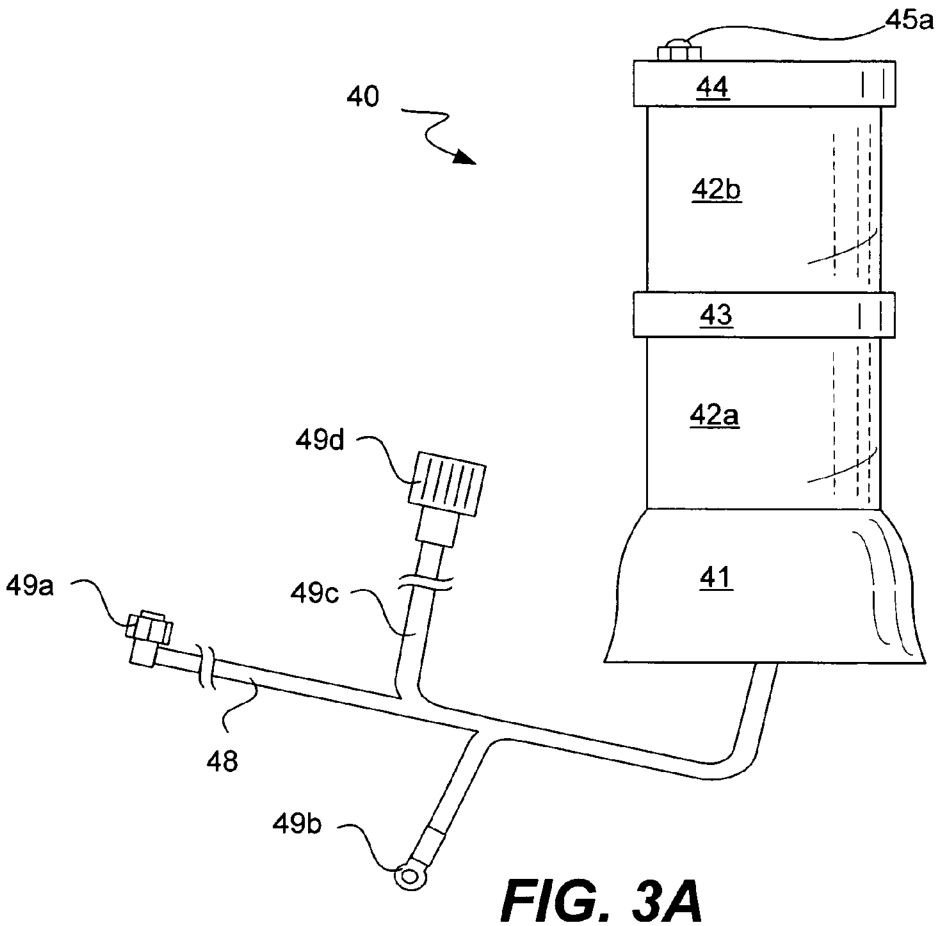
FIGS. 3A and 3B illustrate in side elevation and partial top perspective views a standard cylindrical candle having a candle antenna disposed therewithin.
Figure 3B:
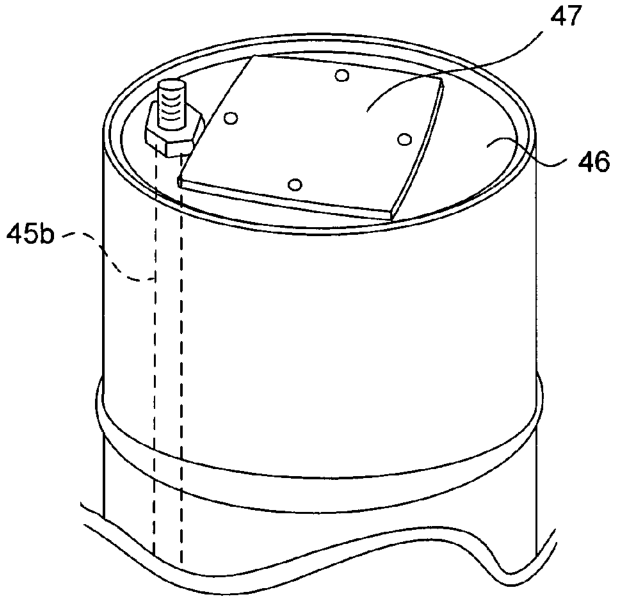

Continuing on to FIGS. 3A and 3B, a standard cylindrical candle 40 having a candle antenna disposed therewithin is illustrated. It will be readily apparent that candle 40 is substantially similar to the candle of Hoorn, in that an antenna is located at the top of the candle under a removable cap, and is adapted to connect to a radio transceiver or receiver outside of the candle. As in Hoorn, candle 40 generally includes a base 41 that is adapted to be mounted to a gaming machine chassis or exterior surface, preferably an upper surface. Base 41 is also adapted to receive a lower cylindrical sleeve 42*a* that transmits light of a particular color from a first light source (not shown) disposed within a lower region of the candle 40. A divider ring 43 is adapted to separate the lower cylindrical sleeve 42*a* from an upper cylindrical sleeve 42*b*, which is preferably adapted to transmit light of a color which is different from that of the light transmitted by the lower cylindrical sleeve. Upper cylindrical sleeve 42*b* also serves as a housing for a second light source (not shown) vertically displaced above the first light source provided within lower cylindrical sleeve 42*a*. Although only two cylindrical sleeve portions and light sources are shown and discussed for purposes of illustration here, it will be understood that any number of sleeves and light sources can be used for a given candle, as desired. A removable cap 44 is provided on top of upper cylindrical sleeve 42*b*, and this removable cap is held in place on top of candle 40 by a nut 45*a* that is screwed onto a threaded vertical conductive rod 45*b*. Rod 45*b* preferably spans the interior of candle 40, providing both support for the overall candle and a means to disguise any internal wiring running from the top of the candle to the bottom of the candle, as explained in Hoorn.

A conductive ground plane 46 or other suitable shelf or support device is preferably mounted in electrical contact with conductive rod 45*b* near the top of the rod. Preferably, ground plane or support device 46 will be circular and sized to snugly fit within second cylindrical sleeve 43*a*. An antenna 47 is then mounted on ground plane 46, and may have an associated coaxial cable 48 that extends downward from the antenna along rod 45*b* through the candle 40 and out through the base 45. Coaxial cable 48 may be terminated with an RF male connector 49*b*, which can connect to a wireless modem in the gaming machine itself. In fact, various electrical connections can be provided from candle 40. A chassis or exterior housing ground strap 49*b* can to be electrically coupled to the metal game chassis or exterior housing. In addition, a light harness 49*c* can be provided with an appropriate connector 49*d* to connect to a power source in the gaming machine and thereby provide the voltage necessary to illuminate the first and second light sources.

Figure 4A:
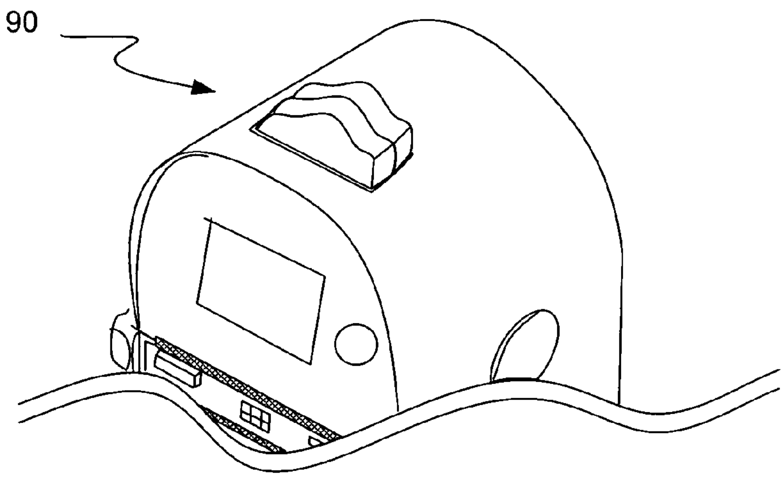
FIGS. 4A-4C illustrate in top perspective and front elevation views several different alternative candles.
Figure 4B:
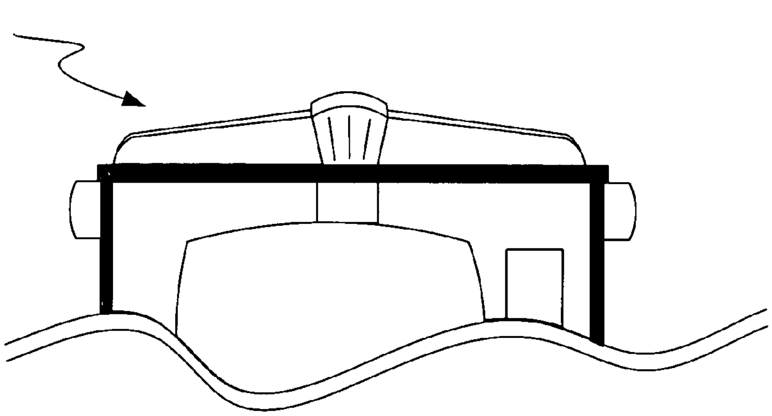
Figure 4C:
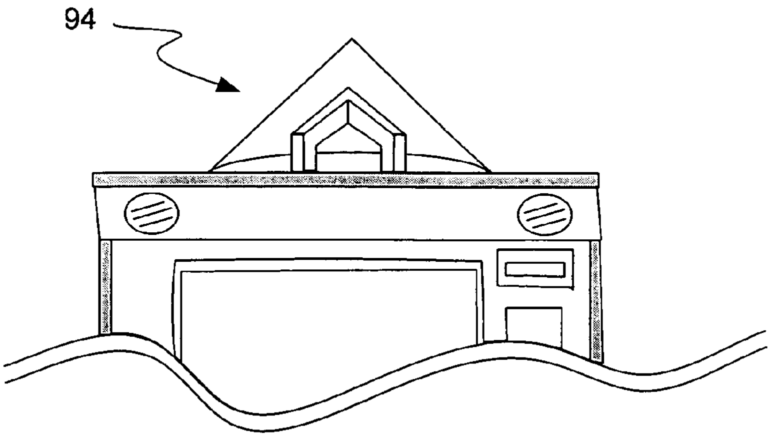

Candle 40 is generally adapted to facilitate wireless communications by way of its antenna and connections to a receiver or transceiver outside the candle itself, as explained in greater detail in Hoorn. Although candle 40 is substantially cylindrical, it will be readily appreciated that a wide variety of shapes, sizes, colors and orientations of candles can also be effectively used. In fact, several examples of different alternative candles are shown in FIGS. 4A through 4C. FIG. 4A depicts a candle 90 in the shape of a taxi sign atop a gaming machine that is similar in nature to gaming machine 10. As in the case of cylindrical candle 40, candle 90 includes two different colored illuminable sections that can be readily seen by floor personnel. Of course, fewer or more than two sections can be provided, if desired. Candle 92 of FIG. 4B is uniquely shaped in that it extends across most all of the top surface of its respective gaming machine, which is substantially different in appearance than gaming machine 10. Each half of candle 92 can be illuminated separately, as well as the center portion. Different colors of illumination and further sections could also be incorporated into candle 92, as desired. FIG. 4C shows a candle 94 in the shape of a pyramid, with separate illuminable sections that can be seen from a variety of angles. As in the foregoing examples, candle 94 can be modified as desired to contain various colors and additional illuminable sections. The gaming machine associated with candle 94 is also somewhat different than any other gaming machine illustrated herein, although it will be appreciated that it is preferably for any candle disclosed herein to be associated with any gaming machine.

It will be readily appreciated that any of candles 90, 92, 94 can be similarly equipped with a candle antenna and connection setup, as in the case of candle 40. It will also be appreciated that any of candles 90, 92, 94 can be similarly adapted with the various candle radio items and capabilities set forth in greater detail below. Further, candles 40, 90, 92 and 94 are only a few examples of the many different candle types possible for use in conjunction with candle antennae, candle radios, and the present invention in general, and it will be understood that a wide variety of items can be used as candles in association with gaming machines, so long as the primary function of providing visual communication from the exterior of a gaming machine to floor personnel and/or security is achieved. As yet further examples, illuminable or other active items along one or more of the bolsters and/or one or more of the bezels of a gaming machine could be considered candles under the right circumstances. As will be readily appreciated, such bolsters and bezels usually are not located atop the gaming machine, but rather at various locations on or about its outer surface. In fact, any of the foregoing exemplary candles might also be placed at some suitable location other than atop the gaming machine, as desired.

Candle Radios

Figure 5A:
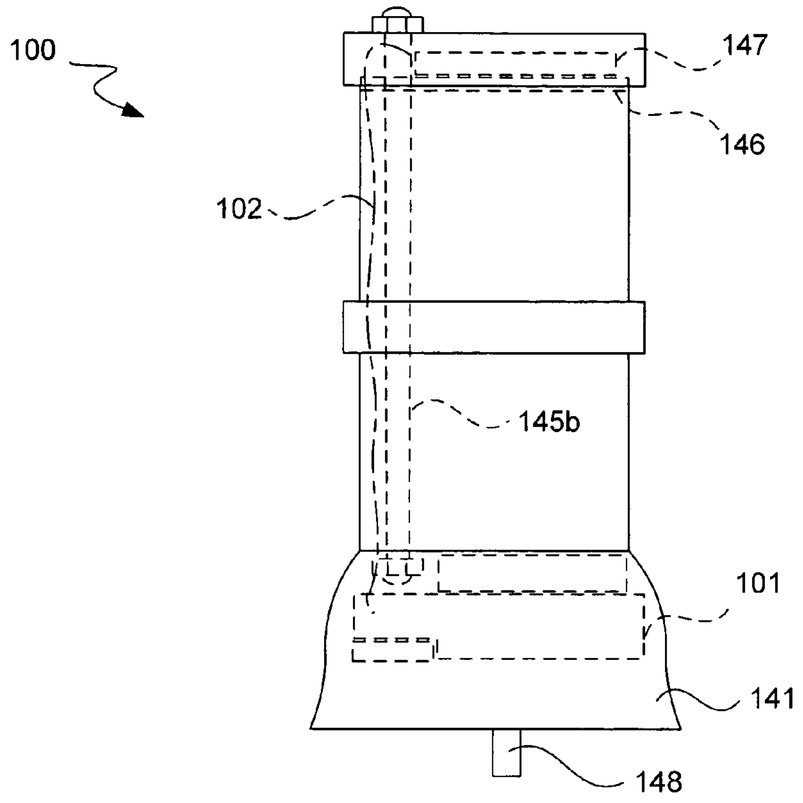
FIGS. 5A and 5B illustrate in side elevation and partial bottom perspective views an exemplary cylindrical candle radio having a transceiver disposed within the candle base according to one embodiment of the present invention.
Figure 5B:
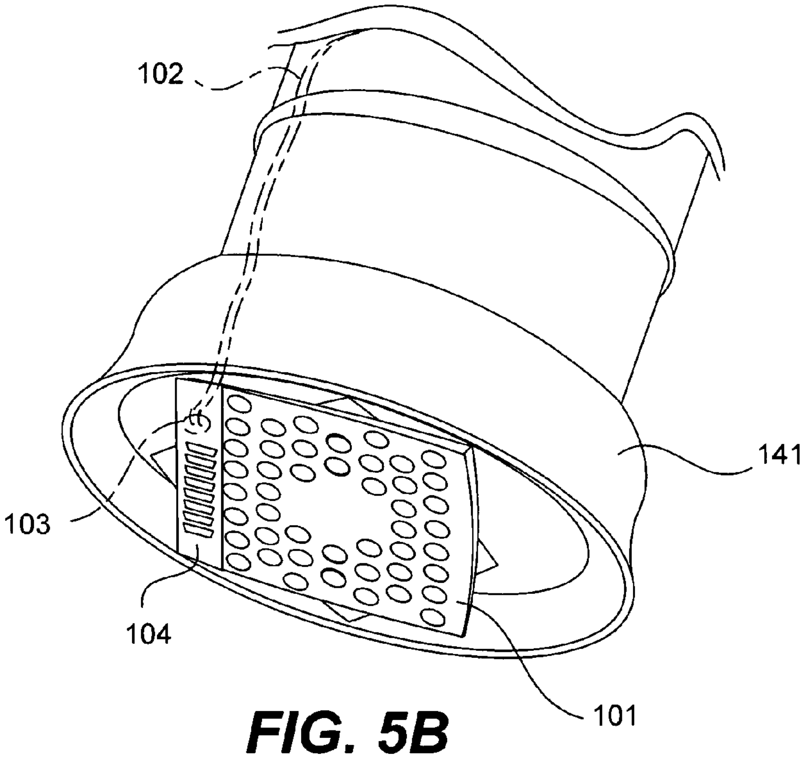

Turning now to FIGS. 5A and 5B an exemplary cylindrical candle radio having a transceiver disposed within the candle base according to one embodiment of the present invention is illustrated in side elevation and partial bottom perspective views. Candle radio 100 can be identical or at least substantially similar in outward appearance to candle 40 above. Of course, similarities to any of alternative candles 90, 92, 94 may also be undertaken if desired, as will be readily appreciated. Many of the various candle components can be the same or substantially similar as well, such as the cylindrical sleeves, light sources, base, removable cap, nut, vertical rod 145*b*, ground plane 146 and antenna 147, among others.

One notable difference, however, is that the radio transceiver or receiver for candle radio 100 is located within the candle itself. As shown, transceiver 101 is located within the base 141 of candle 100, and is coupled with antenna 147 via a coaxial cable, wire or any other similarly suitable connector 102 along rod 145*b*. Due to the self-contained nature of the entire candle radio and the nature of the direct connection between antenna and transceiver, it is specifically contemplated that the coaxial cable, wire or other suitable connector 102 be permanently installed, such as by soldering the wire 102 to both the antenna 147 and transceiver 101, such as at solder point 103 at the transceiver. The actual transceiver itself can be, for example, the AC4490-200m-5 model transceiver manufactured by AeroComm, Inc. of Lenexa, Kans. This particular model transceiver has a form factor of 1.65 by 1.9 inches, and is less than 0.2 inches in thickness. Further specifications for this particular model transceiver can be found online at www.aerocomm.com/OEM/AC4490.htm.

Given its relatively small size, this transceiver can be placed within a hollow candle base or other candle component having an internal diameter of about 2.5 inches or more. In some instances, a candle base or other component may need to be enlarged or replaced with a larger base or component to accommodate such a transceiver, as will be readily appreciated. Of course, other similarly suitable small transceivers may also be used, such as other AC4490 series or AC5124 series transceivers made by AeroComm, as well as those made by various other small transceiver manufacturers. Further, simple receivers might also be used rather than transceivers in cases where radio communications from the candle are not needed or desired. Although much of the description herein primarily refers to transceivers, it will be understood that a simple receiver might alternatively be used in some embodiments of candle radios.

The particular AC4490 model of transceiver provided above is generally configured to operate at 900 MHz, with a maximum power output of 200 milliwatts that is run from a 5-volt power supply. Alternatively, the AC5124 model transceiver is configured to operate at 2.4 GHz, and it will be readily appreciated that other makes and models of transceivers can be used where different frequencies may be desired for a particular application. In addition, these exemplary series of radio transceivers are adapted to accept various different modes of communication and input interfaces. Examples of possible communication protocols that can be used include RS-232, Universal Serial Bus ("USB") and Ethernet, among others. To this end, an appropriate input connector 104 can be included on the transceiver itself, such that a connection can be made at the transceiver to a cable 148 that extends away from the candle radio to a gaming machine or other gaming component, as desired. Such a connector and cable arrangement can also be used to provide power to the candle, such as for operation of the transceiver and light sources.

It will be understood that some communications between candle and gaming machine may be desirable or necessary, such as alerts to various states within or about the gaming machine itself, such as jackpot, maintenance and security alerts. In addition, due to the self-contained nature of the candle radio, it may be possible for external communications to be sent to the candle radio and acted upon entirely within the candle without a need for utilizing communication cable 148 to the gaming machine. For example, an external message to illuminate or shut off a light source within the candle can be received, processed and executed entirely within the candle radio alone, without requiring any communication along cable 148. Further candle radio actions that similarly do not require the use of cable 148 are also possible, such as the splitting and repeater functions set forth in greater detail below.

By mounting the radio transceiver 101 within the candle itself, preferably within the candle base, several significant advantages can be achieved. As noted above, reducing the distance between the antenna and the transceiver will make the overall system more efficient. Since the length of the coaxial cable or other directly connecting wire is shortened significantly, signal losses can be greatly reduced. Also, such wires, and particularly coaxial cables, can be relatively expensive, with price generally correlating to the length of the wire or cable. In addition, the need for any relatively expensive radio frequency connectors or couplers is eliminated, since the coaxial cable or other directly connected wire can be soldered at both ends to the antenna and transceiver. This not only saves costs, but results in a more streamlined product that requires fewer parts and has fewer sources for failure or problems. For example, a cylindrical candle radio having standard candle parts, an antenna and an AC4490 series model transceiver connected by a coaxial cable soldered to both items has a cost of roughly $30, which is significantly cheaper than the candle antenna and separate transceiver box system disclosed in Hoorn.

Furthermore, the connection of the candle to the gaming machine can be relatively simple, as a cable or other wire can be provided from the gaming machine having a modular plug and play attachment that is compatible with the appropriate input connector 104 on the transceiver 101 within the base 141 of the candle 100. As noted above, such a connection can be one that is adapted for use with a USB port, an Ethernet port, an RS-232 port or any other similarly suitable port. The need for a separate transceiver box within the gaming machine cabinet or top box is eliminated as well, thus creating more space within the gaming machine, eliminating the need for separate mountings within the gaming machine, and further streamlining the use of an overall candle antenna and radio system.

In some embodiments, such a plug and play adaptor or attachment might also be adapted to provide connections for the various wiring components needed to supply power and/or signal to the various light sources within the candle as well. Field upgrades and replacements of candle radios can thus be simplified significantly. Since the candle radio unit is now a fully self-contained system that includes the transceiver as well, such units can be swapped out in their entirety, without any need for accessing a receiver box or other additional component within the gaming machine. As is generally known in the art, accessing the inside of a gaming machine can be a cumbersome and time consuming process, particularly where items are located within or behind other items. As such, the processes of installing, operating and maintaining candle radios on gaming machines or other suitable devices can include steps for simply removing, replacing or repairing such candle radios without a need for internal access to the gaming machine or other device. Also, older gaming machines having no radio communication capabilities can be upgraded by simply exchanging an old candle unit with a new candle radio.

In further embodiments, particularly those where communications about more than one frequency are desired, candle radios having more than one antenna and/or more than one transceiver/receiver may be provided. In the event that more sophisticated transceivers are used, multiple antennae may suffice to provide the added functionality desired. Such an additional antenna or antennae may be similarly situated within the candle housing, such as at a second ground plane or other suitable shelf or support device within the candle housing, which could be placed, for example, between two light sources. If desired, such an additional transceiver or transceivers could also be similarly situated within the candle housing, such as stacked alongside or against one other in the base of the candle. Alternatively, such further transceivers may be located at other added ground planes or suitable support shelves or devices within the candle housing, as for any additional antennae.

Candle Radio Functionality

In addition to the various advantages set forth above, it is specifically contemplated that the candle radios of the present invention have added functionality beyond that which is provided by prior candle antenna and radio communication systems. As in the case of prior systems that provide for transceivers in association with candle antennae, the present candle radios having transceivers are also able to receive radio communications from and send radio communications to external wireless access points, as discussed above. It is also specifically contemplated that the candle radios of the present invention be adapted to communicate with each other, in addition to being able to communicate with system access points. As in the case of determining how and when to illuminate one or more of the light sources within the candle, such added functionalities can be performed or orchestrated by the MGC of the gaming machine. Alternatively, an associated outside processor can be adapted to perform such functions, such as where it is desired to lessen the burden on the MGC.

Such inter-radio communications can be original communications between individual candle radios or gaming machines, such as those generated at a candle radio or gaming machine itself, and can also be a simple furthering or propagating of communications of an original radio communication from one candle radio to another, such as along a chain of gaming machines or other suitable devices. By way of such a "repeater" function, an original radio communication from a given wireless access point or originating candle can be propagated to hundreds or thousands of individual gaming machines or candle radios, many of which may be out of the radio range of the originating wireless access point or candle radio. In this manner, radio communications can be "repeated" or sent from device to device into isolated areas, around corners, through narrow and winding hallways, and even into personal rooms or other locations not normally associated with gaming machine use. As a particular example, a slot machine tournament can be set up on an outside patio, with radio communications with an entire wireless system and host being provided to the candle radio of each associated gaming machine via a chain of gaming machines with candle radios that reaches back to an established wireless access point on the main floor of the casino. Of course, many other examples of arranging and using gaming machines with candle radios to provide wireless system access to previously inaccessible areas are also possible, as will be readily apparent.

Another added functionality for candle radios that is contemplated for use in the present invention is that of a "splitter" function. In some instances, it may be desirable for an original radio communication to be split into two or more portions, particularly where a communication is long and only some shortened portion is to be retransmitted to other candle radios. For example, where a particular original radio communication is sent with a specific set of instructions for only one designated candle, and also a general set of instructions for all or several other candles, it would be preferable that any candle receiving the original radio communication should only retransmit the portion that applies to other candles. Of course, only the designated candle would act upon the set of instructions intended for it alone.

For purposes of illustration only, a given access point transmits wireless communications that ordinarily reach 100 gaming machines. In a particular radio communication, a general security command for all gaming machines and a specific command for gaming machine 17 is included. Gaming machine 17 appropriately acts upon this specific command, and all other gaming machines of the original set of 100 ignore it. Any gaming machine in the set of 100 that then retransmits the original radio communication separates or splits the specific command for gaming machine 17 from the general security command, so as not to burden any further gaming machines with this now unnecessary information. This can be particularly useful where several such specific commands are directed toward many original gaming machines and/or where such specific commands are lengthy and thus time and bandwidth consuming.

In addition to the "repeater" and "splitter" functions discussed above, it is also contemplated that a frequency changing or "hopper" function be included within the inventive candle radios. There can be many instances where it becomes desirable for a transmitted or retransmitted radio communication to be made at a specific or altered radio frequency. In one example, an original radio communication is received at a given candle radio at a set radio frequency, such as, for example, 2.4 GHz. This radio communication can be processed at the candle radio, and then be retransmitted from the candle radio at a different radio frequency, such as, for example 5.0 GHz. The use of such frequency changes or "hopping" in radio communications is known to be particularly common where incoming and outgoing communications take place at the same time, such as in the use of cellular and wireless telephones. Such "full duplex" communications are typically required at two different frequencies in order to maintain the integrity of the transceivers and other electronic components in use. In some embodiments, such multiple frequency capabilities can be facilitated through the use of candles having a plurality of transceivers and/or antennae, as noted above.

While such a concurrent incoming and outgoing use is one reason to desire a hopper function, other reasons also exist with respect to the type of communications contemplated in conjunction with the inventive candle radios disclosed herein. One particular added reason arises from the included "splitter" and "repeater" functions discussed above. In fact, some embodiments may even provide for multiple incoming and outgoing radio communications along a spectrum of radio frequencies, as may be permissible through the transceivers and other equipment used. To this end, it may be desirable to provide multiple and/or more sophisticated transceivers and/or associated processing units. For example, a given radio communication can be received at a given candle radio at a first radio frequency. The candle radio then splits this radio communication into four portions, and retransmits each at a different outgoing radio frequency, such that five different radio frequencies in all are utilized. In instances where more sophisticated candle radio transceiver(s) are used, such retransmissions may be made simultaneously. In other instances, they may be made sequentially, preferably after a priority determination has been made.

In this manner, it is possible for candle radios to be programmed to receive and send radio communications at different frequencies based upon the content of the radio communications. For example, general multi-portion communications can be transmitted from wireless access points and/or repeated in their entirety from various candle radios at a given "general" radio frequency. Communication portions that are specific to security issues can be split out and then be retransmitted as only a portion at a separate "security" radio frequency. Similarly, communication portions specific to jackpot issues can be split out and retransmitted at yet another separate "jackpot" radio frequency, and communication portions specific to Advanced Video Platform ("AVP") machine instructions can be split and retransmitted at still another separate "AVP" radio frequency. While it may be desirable for many or all candle radios to be responsive to any communications sent along the "general" or "security" frequencies, it may be desirable for candle radios associated with gaming machines that are not AVP machines to be incapable of processing or be set to ignore communications sent along the AVP frequency, except where simple message repeating or propagating to other gaming machines is desired.

In some embodiments, it may be desirable to provide for at least one or more "regular" frequencies or channels, which can be the relatively lower and/or slower frequencies and channels used by the overall system. One or more relatively higher and/or faster frequencies or channels could then be reserved for emergency or other high priority communications. Such high priority communications might include various security concerns, such as an unauthorized machine door opening or other unexpected access to a gaming machine or other critical area. Other priority communications could involve manual communications or interrupts provided by security personnel, as well as any other form of communication deemed to be worthy of access to a priority frequency or channel. Various additional detailed examples and embodiments of receiving an incoming radio communication, splitting it into several portions, and retransmitting or sending out some or all of the split portions at the same or two or more varying radio frequencies will become readily apparent, and the present invention specifically contemplates the use of all such additional detailed examples and embodiments.

Methods of Use

Figure 6:
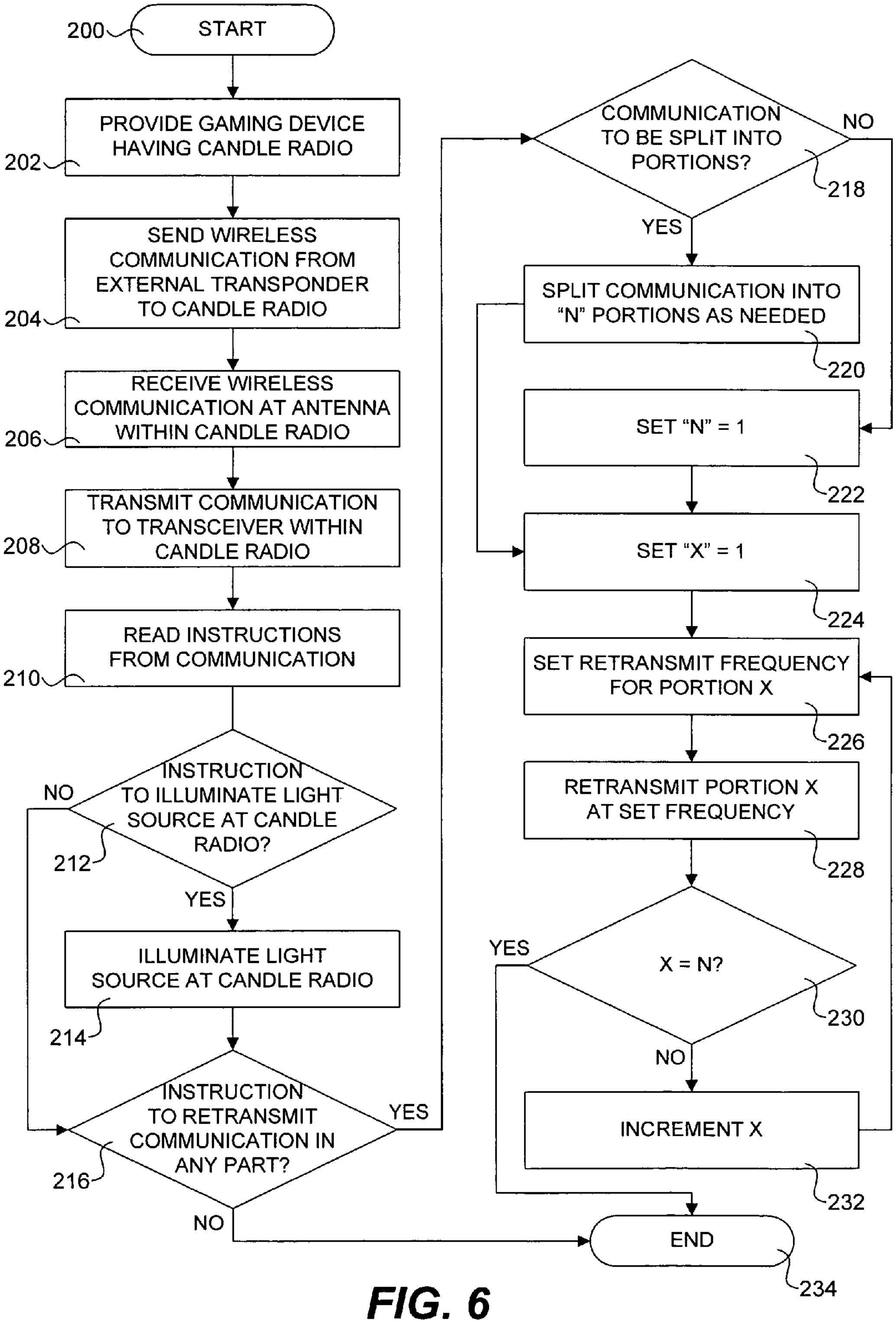
FIG. 6 provides a flowchart of one exemplary method of conducting wireless communications using a candle radio at a gaming machine according to one embodiment of the present invention.

Turning now to FIG. 6, a flowchart conveying an exemplary method of conducting wireless communications using a candle radio at a gaming machine according to one embodiment of the present invention is shown. While the provided flowchart may be comprehensive in some respects, it will be readily understood that not every step provided is necessary, that other steps can be included, and that the order of steps might be rearranged as desired by a given gaming manufacturer, operator, retrofitter or repairperson. After start step 200, a relevant device having a candle radio is provided at a process step 202. While such a device can be a gaming machine, such as, for example, any gaming machine shown in FIG. 1, 2 or 4A-4C and discussed above, it will also be understood that this device could also be any pertinent gaming device that is used at a table game, sports book, keno lounge, or other gaming location, so long as such a device can similarly be outfitted with a candle radio for wireless and communications. Further, as noted above, such a device might also in some instances include other devices outside a gaming industry context, such as, for example, an arcade or carnival game suitable for use with a candle.

At subsequent process step 204, a wireless communication is sent from an external transponder or transceiver to the candle radio, where the communication is then received within or at an antenna at the candle radio at process step 206. The communication is then transmitted to a receiver or transceiver within the candle radio at process step 208, whereupon instructions from the communication are then read at process step 210. Such instructions might be read by a processing component of the receiver or transceiver unit itself, although much of the actual processing related to candle function can also be performed by the MGC of the gaming machine. In the alternative, an associated processor may also be provided, if desired. At decision step 212, an inquiry is made as to whether the read instructions include any command or instruction to illuminate a light source at the candle radio. If so, then the method continues to process step 214, where the light source is then illuminated, whereupon the method then moves to decision step 216. Again, such a decision and action to illuminate can be performed by the MGC or other associated processor.

If no instruction to illuminate a light source is provided, however, then the method skips from decision step 212 to decision step 216 directly. The instruction and action at steps 212 and 214 might also involve a pattern or rate of blinking in the illumination of one or more candle light sources as well. Although the focus of the inquiry at step 212 and the action at step 214 is on the illumination of a candle light source, it will be readily appreciated that other actions or activities might also be similarly included at this stage of the process. For example, a given instruction might concern the sending data or instructions to the MGC or other component of the gaming machine or other device. As another example, a speaker or sound component that might be associated with the candle could be activated by a given instruction. At decision step 216, an inquiry is made as to whether any command or instruction exists for the candle radio to wirelessly transmit data or other items, such as a retransmit of the received communication. Such a decision might also be processed by the MGC or other outside processor, but could also take place solely in the transceiver itself where a pure repeater function is all that is being performed by the candle radio. Of course, such an inquiry and any possible action items would be moot where the candle radio contains only a receiver rather than a transceiver, such that the method would then end at end step 234. The method would also proceed to and end at end step 234 where there is no command or instruction to the candle radio to transmit or retransmit any radio communication, per decision step 216.

Where such a decision results in a "yes," however, the method then continues to decision step 218, where an inquiry is made as to whether the communication to be sent is to be split into portions. Again, such a decision and instructional details that follow therefrom can be performed by the gaming machine MGC or other processor. It will be readily appreciated that such a communication to be sent can be all or part of the original communication received, can be derived as a result of this original communication received, or can be something separate entirely. Where the communication to be sent is to be split, this is accomplished at process step 220, with the communication being split into "N" total portions to be sent. If the communication to be sent is not to be split into multiple portions, however, then the method continues to process step 222, where the value of "N" is set at 1.

Once the value of "N" portions to be sent is determined, a counter value of "X" is set at 1 at process step 224. The method then moves to process step 226, where the transmit frequency for portion X is set. For the first transmission, this would thus involve setting the frequency for portion 1. Of course, where the transmit frequency for a given portion X is the same as the last transmission from the candle radio, then no adjustment is required. At subsequent process step 228, portion X is then transmitted (or for a portion of the original communication, retransmitted) at the frequency set in step 226. An inquiry is then made at decision step 230 as to whether X is equal to N. This effectively concerns whether all portions to be transmitted have indeed been transmitted. If not, then the value of X is incremented at process step 232, and the method reverts to process step 226 for the next communication portion to be transmitted or retransmitted. In the first instance of reaching step 232, this would thus involve incrementing X from 1 to 2, whereby steps 226 through 230 are then repeated for portion 2. When X does equal N at decision step 230, the method then proceeds to and is ended at end step 234. Again, various details and additional steps may similarly be included, not all steps discussed herein may be practiced in a given embodiment, and it is specifically contemplated that many variations of these exemplary methods may also be practiced.

Figure 7:
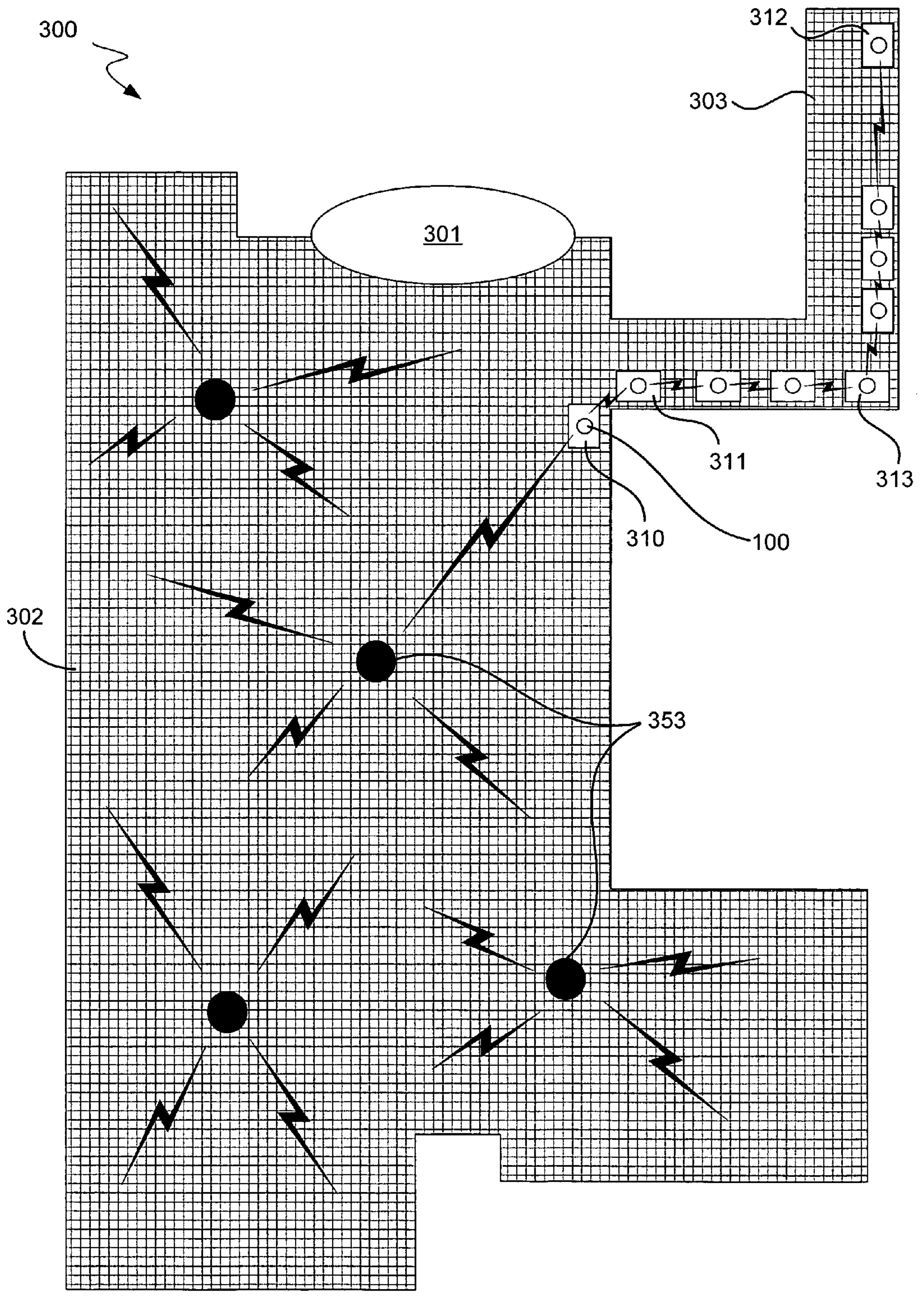
FIG. 7 illustrates a top plan view of an exemplary casino floor layout having multiple gaming machines with candle radios and multiple wireless access points according to one embodiment of the present invention.

FIG. 7 illustrates a top plan view of an exemplary casino floor layout having multiple gaming machines with candle radios and multiple wireless access points according to one embodiment of the present invention. Casino floor layout 300 can be a full or partial layout for an exemplary casino, and includes a variety of pertinent locations and items, such as entryway 301, main floor area 302 and hallway 303. Such a hallway 303 can be one that leads from the main floor area 302 to some other casino or hotel area, such as, for example, a bank of elevators, a restaurant, a gift shop or a casino annex, among others. Four separate wireless access points 353 are shown distributed across main floor area 302, and such access points can be the same or substantially similar to the base station and antenna combinations 52-53 and 54-55 described above. Further, each wireless access point 353 may also comprise a redundant antenna and base station setup, as desired. In one embodiment, the various access points 353 can simply be those that are already installed in a casino or other gaming establishment, such that no new access point or host system items are needed.

As can be seen, the four provided wireless access points 353 are generally arranged such that most or all locations within the main floor area 302 are covered by the wireless range of at least one access point. Various nooks and irregular regions of the floor may also be so covered by the range of at least one access point 353, such as those areas located at the upper left, lower left and lower right portions of casino floor layout 300. Although dozens or hundreds of gaming machines might be located within these covered regions, such gaming machines are not specifically shown in FIG. 7 for simplicity of illustration. As is generally known in the art and can be readily appreciated, some areas or specific locations within a casino floor plan may simply not be covered by the range of any wireless access point. Such areas or locations can include far wall regions, extreme nooks, hallways and the like.

In many such cases, it is not worthwhile or cost effective for a casino or other gaming operator to install a wireless access point for such isolated regions or locations. This is particularly true where an added access point would only extend wireless service to one or a handful of gaming machines, since the cost of installing and maintaining each access point can be considerable. In situations where such an isolated region, such as hallway 303, does contain a few gaming machines, such hallway or other isolated region gaming machines have traditionally simply not included in the overall wireless network.

As provided through the present invention, however, such hallway and other isolated gaming machines can be included in the overall wireless network without adding further access points, but rather through the repeater function of other candle radios. As shown in FIG. 7, gaming machine 310 is at the edge of main floor area 302, but is able to communicate directly with a wireless access point 353. Gaming machine 310 is outfitted with a candle radio 100, and can otherwise be substantially similar to gaming machine 10 above. Gaming machine 311, which is also outfitted with a candle radio, is not within range of any of the provided wireless access points 353. However, gaming machine 311 is sufficiently close to gaming machine 310 that it is able to communicate with gaming machine 310 through the candle radios of both gaming machines, and can thus communicate with a wireless access point, albeit indirectly through gaming machine 310. Similarly, each gaming machine in a chain along hallway 303 is able to communicate with the gaming machines next to it via the repeater functions in the candle radios of some or all of the hallway gaming machines. Accordingly, gaming machine 312 toward the end of the hallway 303 is able to receive and transmit wirelessly using its candle radio through the candle radios of other gaming machines between it and gaming machine 310.

Although it is preferable that most or all of the gaming machines within hallway 303 or another similarly isolated area have candle radios with transceivers, it is also possible for all such gaming machines to be a part of the wireless network even where some do not have candle radios with transceivers. For example, the next gaming machine or two in the hallway chain after gaming machine 311 may only have receivers and/or may have the candle antenna setup of Hoorn. While such gaming machines may thus be unable to retransmit radio communications, it may still be possible for gaming machine 311 to reach several gaming machines with its own candle radio. As a particular example, if only gaming machines 311, 312, and 313 (in the corner of the hallway dogleg) are equipped with candle radios having transceivers installed, and these gaming machines are able to provide radio communications coverage to the entire hallway 303, then all of the gaming machines in the hallway may still be a part of the wireless network.

Other isolated areas or regions may also be serviced as part of an overall wireless network through similar candle radio to candle radio communications. For example, it may be the case that some outer portions of main floor area 302 cannot be reached by a wireless access point 353, either because such areas are out of range or some obstruction exists. Where gaming machines line the walls at the lower left and lower right walls of main floor area 302, and these outer areas either receive no coverage or weak signal coverage from the wireless access points, then candle radio to candle radio communications can take place with gaming machines that are between the wireless access points and the gaming machines along such walls.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. A gaming machine adapted for accepting a wager, playing a game based on the wager and granting a monetary payout based on the result of the game, comprising:

an exterior chassis having an upper surface and arranged to contain a plurality of internal gaming machine components therein;

a master gaming controller in communication with at least one of said plurality of internal gaming machine components, said master gaming controller being adapted to execute or control one or more aspects of said game; and a candle radio in communication with said master gaming controller and disposed atop said upper surface, said candle radio including;

a substantially hollow candle housing, said candle housing being at least partially transparent to light, a first light source disposed within said candle housing and arranged such that light emitting therefrom is visible outside of said candle housing, an antenna disposed within said candle housing and adapted to facilitate radio communications with a first external transceiver, and a first candle transceiver disposed within said candle housing and in communication with said antenna, said first candle transceiver adapted to conduct radio communications with said first external transceiver, wherein said first external transceiver comprises a second candle transceiver situated at a second separate gaming machine, wherein said first candle transceiver is further adapted to conduct radio communications with a wireless system access point, and wherein said first candle transceiver is further adapted to:

receive a first radio communication from a wireless system access point, the first radio communication including a plurality of content portions associated with different events related to gaming machine activity, the events including items selected from the group consisting of a security event, a jackpot event, a gaming machine platform event, a high priority event, and a low priority event;

divide the first radio communication into frequency portions corresponding to the respective content portions, the frequency portions having separate frequencies different from a frequency of the first radio communication, the frequency portions including a first frequency portion having a first frequency and including a first content portion associated with a first gaming machine activity event, and a second frequency portion having a second frequency and including a second content portion associated with a second gaming machine activity event different from the first gaming machine activity event;

transmit the divided frequency portions of the first radio communication to said first external transceiver, each transmitted frequency portion including the corresponding content portion of the first radio communication, such that the first frequency portion is transmitted on the first frequency, the second frequency portion is transmitted on the second frequency, and the transmitted frequency portion identifies the gaming machine activity event associated with the corresponding content portion of the first radio communication, said first external transceiver being tuned to receive or not receive a designated one or more of the transmitted frequency portions, said first external transceiver configured to act responsive to receiving the designated one or more transmitted frequency portions, wherein the first frequency is reserved for high-priority events and the second frequency is reserved for low-priority events, the first gaming machine activity event comprises a high-priority event, and the second gaming machine activity event comprises a low-priority event, the first external transceiver is tuned to receive at least the first frequency portion and the second frequency portion; and conduct radio communications with a second external transceiver, wherein the second external transceiver comprises a third candle transceiver from a third separate gaming machine, and the second external transceiver is tuned to receive at least the first frequency portion and further tuned to not receive the second frequency portion, and the second external transceiver is configured to act in response to receiving the first frequency portion, wherein the first frequency portion comprises at least one security communication, including an indication of an unexpected access to a gaming machine.

2. The gaming machine of claim 1, wherein said candle radio further includes a mounting mechanism configured to mount said candle radio to said gaming machine.

3. The gaming machine of claim 1, wherein said antenna is positioned above said first light source.

4. The gaming machine of claim 1, wherein said candle housing is substantially cylindrical in nature.

5. The gaming machine of claim 1, wherein said candle radio further includes a base at the bottom of said candle housing.

6. The gaming machine of claim 1, wherein said first candle transceiver includes at least one input connector adapted to facilitate further communications with said master gaming controller.

7. The gaming machine of claim 1, wherein said first candle transceiver is further adapted to receive a first radio communication from said second external transceiver and forward at least a first portion of said first radio communication to said first external transceiver.

8. The gaming machine of claim 5, wherein said first candle transceiver is disposed within said base at the bottom of said candle housing.

9. The gaming machine of claim 6, wherein said at least one input connector is selected from the group consisting of RS-232, USB and Ethernet connectors.

10. A gaming system adapted for accepting wagers, playing games based on the wagers and granting monetary payouts based on the results of the games, comprising:

a plurality of physical terminals including input and output devices adapted to facilitate the acceptance of said wagers, display of said games and granting of said monetary payouts;

at least one master gaming controller in communication with one or more of said plurality of input and output devices, said at least one master gaming controller being adapted to execute or control one or more aspects of said games;

a plurality of candle radios associated with said plurality of physical terminals, each candle radio including a substantially hollow candle housing that is at least partially transparent to light, a light source within said candle housing and arranged such that light emitting therefrom is visible outside of said candle housing, an antenna disposed within said candle housing and adapted to facilitate radio communications with an external transceiver, and a candle transceiver disposed within said candle housing and in communication with said antenna, said candle transceiver adapted to conduct radio communications with said external transceiver;

a host computer in communication with said plurality of candle radios, wherein said host computer is arranged to process data from said plurality of candle radios, issue instructions to said plurality of candle radios, or both;

at least one wireless system access point including a transceiver electrically coupled to said host computer and adapted to conduct radio communications with at least one of said plurality of candle radios, wherein at least a first of said plurality of candle radios is adapted to conduct radio communications with said at least one wireless system access point and also with at least a second of said plurality of candle radios, wherein said first candle radio is further adapted to:

receive a first radio communication from a wireless system access point, the first radio communication including a plurality of content portions associated with different events related to gaming machine activity, the events including items selected from the group consisting of a security event, a jackpot event, a gaming machine platform event, a high priority event, and a low priority event;

divide the first radio communication into frequency portions corresponding to the respective content portions, the frequency portions having separate frequencies different from a frequency of the first radio communication, the frequency portions including a first frequency portion having a first frequency and including a first content portion associated with a first gaming machine activity event, and a second frequency portion having a second frequency and including a second content portion associated with a second gaming machine activity event different from the first gaming machine activity event;

transmit the divided frequency portions of the first radio communication to said second candle radio, each transmitted frequency portion including the corresponding content portion of the first radio communication, such that the first frequency portion is transmitted on the first frequency, the second frequency portion is transmitted on the second frequency, and the transmitted frequency portion identifies the gaming machine activity event associated with the corresponding content portion of the first radio communication, said second candle radio being tuned to receive or not receive a designated one or more of the transmitted frequency portions, said second candle radio configured to act responsive to receiving the designated one or more transmitted frequency portions, wherein the first frequency is reserved for high-priority events and the second frequency is reserved for low-priority events, the first gaming machine activity event comprises a high-priority event, and the second gaming machine activity event comprises a low-priority event, the second candle radio is tuned to receive at least the first frequency portion and the second frequency portion, and conduct radio communications with a third candle radio, wherein the third candle radio comprises a second candle transceiver from a second gaming machine, and the third candle radio is tuned to receive at least the first frequency portion and further tuned to not receive the second frequency portion, and the third candle radio is configured to act in response to receiving the first frequency portion, wherein the first frequency portion comprises at least one security communication, including an indication of an unexpected access to a gaming machine.

11. The gaming system of claim 10, wherein at least one of said plurality of physical terminals comprises a gaming machine.

12. The gaming system of claim 10, wherein at least one of said plurality of candle radios further includes a mounting mechanism configured to mount said at least one candle radio to at least one of said plurality of physical terminals.

13. The gaming system of claim 10, wherein at least one of said plurality of candle radios further includes a base at the bottom of said candle housing, and wherein said candle transceiver is disposed within said base at the bottom of said candle housing.

14. The gaming system of claim 10, wherein said first candle radio is further adapted to conduct radio communications with a third of said plurality of candle radios.

15. The gaming system of claim 14, wherein said first candle radio is further adapted to receive a first radio communication from said second candle radio and forward at least a portion of said first radio communication to said third candle radio.

16. A candle radio, comprising:

an exterior candle housing, said candle housing being at least partially transparent to light;

a first light source disposed within said candle housing and arranged such that light emitting therefrom is visible outside of said candle housing;

an antenna disposed within said candle housing and adapted to receive a signal from an external transponder; and a receiver disposed within said candle housing and in communication with said antenna, said receiver adapted to take an appropriate action in response to said signal wherein said receiver comprises a first transceiver that is also adapted to provide communications from said candle radio, wherein said first transceiver is further adapted to conduct radio communications with one or more separate candle radios and one or more wireless system access points, and wherein said first transceiver is further adapted to:

receive a first radio communication from a wireless system access point, the first radio communication including a plurality of content portions associated with different events related to gaming machine activity, the events including items selected from the group consisting of a security event, a jackpot event, a gaming machine platform event, a high priority event, and a low priority event;

divide the first radio communication into frequency portions corresponding to the respective content portions, the frequency portions having separate frequencies different from a frequency of the first radio communication, the frequency portions including a first frequency portion having a first frequency and including a first content portion associated with a first gaming machine activity event, and a second frequency portion having a second frequency and including a second content portion associated with a second gaming machine activity event different from the first gaming machine activity event;

transmit the divided frequency portions of the first radio communication to a first separate candle radio, each transmitted frequency portion including the corresponding content portion of the first radio communication, such that the first frequency portion is transmitted on the first frequency, the second frequency portion is transmitted on the second frequency, and the transmitted frequency portion identifies the gaming machine activity event associated with the corresponding content portion of the first radio communication, said first separate candle radio being tuned to receive or not receive a designated one or more of the transmitted frequency portions, said first separate candle radio configured to act responsive to receiving the designated one or more transmitted frequency portions;

wherein the first frequency is reserved for high-priority events and the second frequency is reserved for low-priority events, the first gaming machine activity event comprises a high-priority event, and the second gaming machine activity event comprises a low-priority event, the first separate candle radio is tuned to receive at least the first frequency portion and the second frequency portion; and conduct radio communications with a second separate candle radio, wherein the second separate candle radio comprises a second transceiver from a separate gaming machine, and the second separate candle radio is tuned to receive at least the first frequency portion and further tuned to not receive the second frequency portion, and the second separate candle radio is configured to act in response to receiving the first frequency portion, wherein the first frequency portion comprises at least one security communication, including an indication of an unexpected access to a gaming machine.

17. The candle radio of claim 16, further comprising:

a mounting mechanism configured to mount said candle radio assembly to an associated machine.

18. The candle radio of claim 16, further comprising:

a base at the bottom of said candle housing, wherein said receiver is disposed within said base at the bottom of said candle housing.

19. The candle radio of claim 16, wherein said external transponder comprises another separate candle radio.

20. A gaming machine, comprising:

a physical terminal having an outer surface and arranged to contain one or more internal gaming machine components therein;

a master gaming controller in communication with at least one of said one or more internal gaming machine components, said master gaming controller being adapted to execute or control one or more aspects of said game; and a candle radio disposed about said outer surface, said candle radio including:

an exterior candle housing, said candle housing being at least partially transparent to light, a first light source disposed within said candle housing and arranged such that light emitting therefrom is visible outside of said candle housing, an antenna disposed within said candle housing and adapted to facilitate wireless communications with an external transponder, and a receiver disposed within said candle housing and in communication with said antenna, said receiver adapted to conduct and act upon wireless communications with said external transponder, wherein said receiver comprises a first transceiver that is adapted to provide communications from said candle radio, wherein said first transceiver is further adapted to conduct radio communications with one or more separate candle radios and one or more wireless system access points, and wherein said first transceiver is further adapted to:

receive a first radio communication from a wireless system access point, the first radio communication including a plurality of content portions associated with different events related to gaming machine activity, the events including items selected from the group consisting of a security event, a jackpot event, a gaming machine platform event, a high priority event, and a low priority event;

divide the first radio communication into frequency portions corresponding to the respective content portions, the frequency portions having separate frequencies different from a frequency of the first radio communication, the frequency portions including a first frequency portion having a first frequency and including a first content portion associated with a first gaming machine activity event, and a second frequency portion having a second frequency and including a second content portion associated with a second gaming machine activity event different from the first gaming machine activity event;

transmit the divided frequency portions of the first radio communication to a separate candle radio, each transmitted frequency portion including the corresponding content portion of the first radio communication, such that the first frequency portion is transmitted on the first frequency, the second frequency portion is transmitted on the second frequency, and the transmitted frequency portion identifies the gaming machine activity event associated with the corresponding content portion of the first radio communication, said separate candle radio being tuned to receive or not receive a designated one or more of the transmitted frequency portions, said separate candle radio configured to act responsive to receiving the designated one or more transmitted frequency portions, wherein the first frequency is reserved for high-priority events and the second frequency is reserved for low-priority events, the first gaming machine activity event comprises a high-priority event, and the second gaming machine activity event comprises a low-priority event, the first separate candle radio is tuned to receive at least the first frequency portion and the second frequency portion; and conduct radio communications with a second separate candle radio, wherein the second separate candle radio comprises a second transceiver from a separate gaming machine, and the second separate candle radio is tuned to receive at least the first frequency portion and further tuned to not receive the second frequency portion, and the second separate candle radio is configured to act in response to receiving the first frequency portion, wherein the first frequency portion comprises at least one security communication, including an indication of an unexpected access to a gaming machine.

21. A method of conducting wireless communications within a gaming system, comprising:

providing a gaming machine having an exterior housing arranged to contain a plurality of internal gaming machine components therein and an associated candle radio visible from outside said gaming machine, said candle radio including a candle housing that is at least partially transparent to light, a first light source disposed within said candle housing and arranged such that light emitting therefrom is visible outside of said candle housing, an antenna disposed within said candle housing and adapted to facilitate wireless communications with an external transponder, and a candle receiver disposed within said candle housing and in communication with said antenna;

sending a wireless communication from said external transponder to said candle radio, the wireless communication including a plurality of content portions associated with different events related to gaming machine activity, the events including items selected from the group consisting of a security event, a jackpot event, a gaming machine platform event, a high priority event, and a low priority event;

receiving the wireless communication at said antenna disposed within said candle housing;

transmitting said communication to said candle receiver disposed within said candle housing; and acting upon said communication at said candle receiver disposed within said candle housing after receiving said communication, wherein said candle receiver comprises a transceiver, wherein said step of acting upon said communication includes:

identifying the content portions of the wireless communication;

determining that the wireless communication is to be parsed into frequency portions;

dividing the wireless communication into frequency portions corresponding to the respective identified content portions, the frequency portions having separate frequencies, the frequency portions including a first frequency portion having a first frequency and including a first content portion associated with a first gaming machine activity event, and a second frequency portion having a second frequency and including a second content portion associated with a second gaming machine activity event different from the first gaming machine activity event;

transmitting the divided frequency portions of the wireless communication from the candle radio to one or more first external receivers of one or more second candle radios of second gaming machines, each transmitted frequency portion including the corresponding content portion of the wireless communication, such that the first frequency portion is transmitted on the first frequency, the second frequency portion is transmitted on the second frequency, and the transmitted frequency portion identifies the gaming machine activity event associated with the corresponding content portion of the wireless communication, the one or more external receivers being tuned to receive or not receive a designated one or more of the transmitted frequency portions, the one or more first external receivers configured to act responsive to receiving the designated one or more transmitted frequency portions, wherein the first frequency is reserved for high-priority events and the second frequency is reserved for low-priority events, the first gaming machine activity event comprises a high-priority event, and the second gaming machine activity event comprises a low-priority event, the one or more first external receivers are tuned to receive at least the first frequency portion and the second frequency portion; and communicating via radio with a second external receiver of a third gaming machine, wherein the second external receiver is tuned to receive at least the first frequency portion and further tuned to not receive the second frequency portion, and the second external receiver is configured to act in response to receiving the first frequency portion, wherein the first frequency portion comprises at least one security communication, including an indication of an unexpected access to a gaming machine.

22. The method of claim 21, wherein said step of acting upon said communication includes causing said first light source to become illuminated.

23. The method of claim 21, further including the step of:

replacing said entire candle radio at said gaming machine with another entire candle radio, wherein said step of replacing does not involve any internal access to said gaming machine.

24. A method of parsing wireless communications at a candle radio situated at a gaming machine within a gaming system, the candle radio visible from outside the gaming machine, the candle radio including a candle housing at least partially transparent to light, a first light source disposed within the candle housing and arranged such that light emitting therefrom is visible outside of the candle housing, an antenna disposed within the candle housing and adapted to facilitate wireless communications with an external transponder, a candle receiver disposed within the candle housing and in communication with said antenna, and a candle transmitter, the method comprising:

receiving, at the antenna of the candle radio, a wireless communication provided from the external transponder, the wireless communication including a plurality of content portions associated with different events related to gaming machine activity, the events including items selected from the group consisting of a security event, a jackpot event, a gaming machine platform event, a high priority event, and a low priority event;

providing the wireless communication from the antenna to the candle receiver of the candle radio;

identifying the content portions of the wireless communication;

determining that the wireless communication is to be parsed into frequency portions;

dividing the wireless communication into frequency portions corresponding to the respective identified content portions, the frequency portions having separate frequencies, the frequency portions including a first frequency portion having a first frequency and including a first content portion associated with a first gaming machine activity event, and a second frequency portion having a second frequency and including a second content portion associated with a second gaming machine activity event different from the first gaming machine activity event;

transmitting the divided frequency portions of the wireless communication from the transmitter of the candle radio to one or more first external receivers of one or more further candle radios of second gaming machines, each transmitted frequency portion including the corresponding content portion of the wireless communication, such that the first frequency portion is transmitted on the first frequency, the second frequency portion is transmitted on the second frequency, and the transmitted frequency portion identifies the gaming machine activity event associated with the corresponding content portion of the wireless communication, the one or more first external receivers being tuned to receive or not receive a designated one or more of the transmitted frequency portions, the one or more first external receivers configured to act responsive to receiving the designated one or more transmitted frequency portions, wherein the first frequency is reserved for high-priority events and the second frequency is reserved for low-priority events, the first gaming machine activity event comprises a high-priority event, and the second gaming machine activity event comprises a low-priority event, the one or more first external receivers are tuned to receive at least the first frequency portion and the second frequency portion; and communicating via radio with a second external receiver of a third gaming machine, wherein the second external receiver is tuned to receive at least the first frequency portion and further tuned to not receive the second frequency portion, and the second external receiver is configured to act in response to receiving the first frequency portion, wherein the first frequency portion comprises at least one security communication, including an indication of an unexpected access to a gaming machine.

* * * * *